(12) United States Patent
Hwangbo et al.

(10) Patent No.: US 12,442,920 B2
(45) Date of Patent: Oct. 14, 2025

(54) ELECTRONIC APPARATUS AND CONTROL METHOD THEREOF

(71) Applicant: Samsung Electronics Co., Ltd., Suwon-si (KR)

(72) Inventors: Minsu Hwangbo, Suwon-si (KR); Hyunseok Hong, Suwon-si (KR); Boseok Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 706 days.

(21) Appl. No.: 17/069,316

(22) Filed: Oct. 13, 2020

(65) Prior Publication Data

US 2021/0132225 A1 May 6, 2021

(30) Foreign Application Priority Data

Nov. 6, 2019 (KR) .................. 10-2019-0141199

(51) Int. Cl.
*G01S 17/08* (2006.01)
*G01S 17/89* (2020.01)
*G01S 17/931* (2020.01)

(52) U.S. Cl.
CPC .............. *G01S 17/08* (2013.01); *G01S 17/89* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 7,050,177 B2 | 5/2006 | Tomasi et al. | |
| 7,417,716 B2* | 8/2008 | Nagasaka | H10F 55/255 |
| | | | 257/E25.032 |
| 10,996,052 B2 | 5/2021 | He et al. | |
| 11,119,191 B2 | 9/2021 | Hwang et al. | |
| 11,172,838 B2 | 11/2021 | Park et al. | |
| 11,500,076 B2 | 11/2022 | Keilaf et al. | |
| 11,513,200 B2 | 11/2022 | Ikezawa | |

(Continued)

FOREIGN PATENT DOCUMENTS

| | | |
|---|---|---|
| CN | 104856663 A | 8/2015 |
| CN | 109298427 A | 2/2019 |

(Continued)

OTHER PUBLICATIONS

International Search Report dated Jan. 18, 2021, issued in International Application No. PCT/KR2020/013912.

(Continued)

*Primary Examiner* — Hovhannes Baghdasaryan
(74) *Attorney, Agent, or Firm* — Jefferson IP Law, LLP

(57) ABSTRACT

An electronic apparatus is provided. The electronic apparatus includes a sensor, a first light source configured to irradiate a first light, a second light source configured to irradiate a second light in a direction different from the first light, and a processor configured to, based on first and second reflected lights being received by the sensor as the first and second lights are reflected by an object, calculate a first distance between the electronic apparatus and an object reflecting the first light and a second distance between the electronic apparatus and an object reflecting the second light using different calculation methods.

15 Claims, 24 Drawing Sheets

(56) References Cited

U.S. PATENT DOCUMENTS

| | | | |
|---|---|---|---|
| 2015/0168954 A1* | 6/2015 | Hickerson | G01S 17/04 901/1 |
| 2015/0193933 A1 | 7/2015 | Lim et al. | |
| 2015/0253428 A1 | 9/2015 | Holz | |
| 2016/0123723 A1 | 5/2016 | Wang | |
| 2016/0205306 A1 | 7/2016 | Wang et al. | |
| 2017/0090020 A1 | 3/2017 | Buettgen | |
| 2017/0199271 A1 | 7/2017 | Nihei et al. | |
| 2018/0038944 A1 | 2/2018 | Hellmig et al. | |
| 2019/0094346 A1 | 3/2019 | Dumoulin et al. | |
| 2019/0098233 A1 | 3/2019 | Gassend et al. | |
| 2019/0101623 A1 | 4/2019 | Galera et al. | |
| 2019/0195991 A1 | 6/2019 | Miki et al. | |
| 2019/0293765 A1 | 9/2019 | Jeong et al. | |
| 2019/0339393 A1* | 11/2019 | Lingg | G06V 20/58 |
| 2020/0410707 A1 | 12/2020 | Ajiki | |

FOREIGN PATENT DOCUMENTS

| | | |
|---|---|---|
| CN | 110268283 A | 9/2019 |
| CN | 110291414 A | 9/2019 |
| JP | 2005-0241340 A | 9/2005 |
| JP | 2019-164011 A | 9/2019 |
| JP | 2019-174308 A | 10/2019 |
| KR | 10-1416354 B1 | 7/2014 |
| KR | 10-2015-0093058 A | 8/2015 |
| KR | 10-2019-0014313 A | 2/2019 |

OTHER PUBLICATIONS

Written Opinion dated Jan. 18, 2021, issued in International Application No. PCT/KR2020/013912.

Extended European Search Report dated Jul. 5, 2022, issued in European Patent Application No. 20885837.3-1206.

European Search Report dated Oct. 31, 2023; European Appln. No. 20 885 837.3-1206.

Korean Office Action with English translation dated Nov. 20, 2024; Korean Appln. No. 10-2019-0141199.

Chinese Office Action with English translation dated Feb. 26, 2025; Chinese Appln. No. 202080076818.5.

Korean Office Action with English translation dated Jul. 24, 2025; Korean Appln. No. 10-2019-0141199.

Chinese Office Action with English translation dated Aug. 22, 2025; Chinese Appln. No. 202080076818.5.

* cited by examiner

| THICKNESS OF REFLECTED LIGHT BY FIRST LIGHT SOURCE (MM) | THICKNESS OF REFLECTED LIGHT BY SECOND LIGHT SOURCE (MM) | DISTANCE FROM OBJECT (M) |
|---|---|---|
| 0.1 | 0.2 | 5 |
| 0.2 | 0.3 | 4 |
| 0.3 | 0.4 | 3 |
| 0.4 | 0.5 | 2 |
| 0.5 | 0.6 | 1 |

ELECTRONIC APPARATUS AND CONTROL METHOD THEREOF

CROSS-REFERENCE TO RELATED APPLICATION(S)

This application is based on and claims priority under 35 U.S.C. § 119(a) of a Korean patent application number 10-2019-0141199, filed on Nov. 6, 2019, in the Korean Intellectual Property Office, the disclosure of which is incorporated by reference herein in its entirety.

BACKGROUND

1. Field

The disclosure relates to an electronic apparatus and a method for controlling thereof. More particularly, the disclosure relates to an electronic apparatus capable of sensing an object around the electronic apparatus and a method for controlling thereof.

2. Description of Related Art

The development of electronic technology has led to the development of a variety of electronic apparatuses. In particular, there has recently been developed an electronic apparatus, such as an automated driving vehicle that performs driving on behalf of a human, an automated guided vehicle that classifies goods by itself, and carries the goods to a destination, and a robot cleaner that performs cleaning while driving the indoor space within a house by itself.

To prevent a collision with an object during driving, this kind of electronic apparatus needs to sense various objects located around the electronic apparatus. For this purpose, an electronic apparatus having a sensor (e.g., an image sensor or a light detection and ranging (LiDAR) sensor or the like) capable of sensing an object around an electronic apparatus using a plurality of light sources has been developed.

A related-art electronic apparatus having a plurality of light source-based sensors emits a plurality of light through a plurality of light sources, and when a plurality of reflected light is received in the sensor, it is recognized that different objects exist at different positions. However, the plurality of reflected light may be light reflected from one object, rather than light reflected from different objects. In the latter case, the related-art electronic apparatus has a problem of recognizing as if a plurality of objects are present, even though only one object is actually present around the electronic apparatus.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a user with an electronic apparatus including a sensor, a first light source configured to irradiate a first light, a second light source configured to irradiate a second light in a direction different from the first light, and a processor configured to, based on first and second reflected lights being received by the sensor as the first and second lights are reflected by an object, calculate a first distance between the electronic apparatus and an object reflecting the first light and a second distance between the electronic apparatus and an object reflecting the second light using different calculation methods.

Additional aspects will be set forth in part in the description which follows and, in part, will be apparent from the description, or may be learned by practice of the presented embodiments.

In accordance with an aspect of the disclosure, a method for controlling an electronic apparatus is provided. The method includes irradiating a first light through a first light source and irradiating a second light in a direction different from the first light through a second light source, and, based on first and second reflected lights being received by the sensor as the first and second lights are reflected by an object, calculating a first distance between the electronic apparatus and an object reflecting the first light and a second distance between the electronic apparatus and an object reflecting the second light using different calculation methods.

In accordance with another aspect of the disclosure, a sensor is provided. The sensor includes a plurality of pixels, a first light source configured to irradiate a first light, a second light source configured to irradiate a second light in a direction different from the first light, and a processor configured to, based on receiving the first and second reflected lights at the plurality of pixels as the first and second lights are reflected by an object, calculate a first distance between an electronic apparatus and an object reflecting the first light and a second distance between the electronic apparatus and an object reflecting the second light using different calculation methods.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a diagram illustrating an embodiment of identifying reflected light by first light source and reflected light by second light source using information on a thickness of reflected light according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When it is decided that a detailed description for the known art related to the disclosure may unnecessarily obscure the gist of the disclosure, the detailed description of the known art may be shortened or omitted.

Various example embodiments will be described in greater detail below with reference to the attached drawings, but it will be understood that the disclosure is not limited by the various example embodiments described herein.

Hereinafter, the embodiment will be described in greater detail below with reference to the drawings.

The disclosure provides an electronic apparatus capable of identifying whether a plurality of reflected lights received at a sensor are lights reflected by one object or by a plurality of objects and a method for controlling thereof.

Figure 1A:
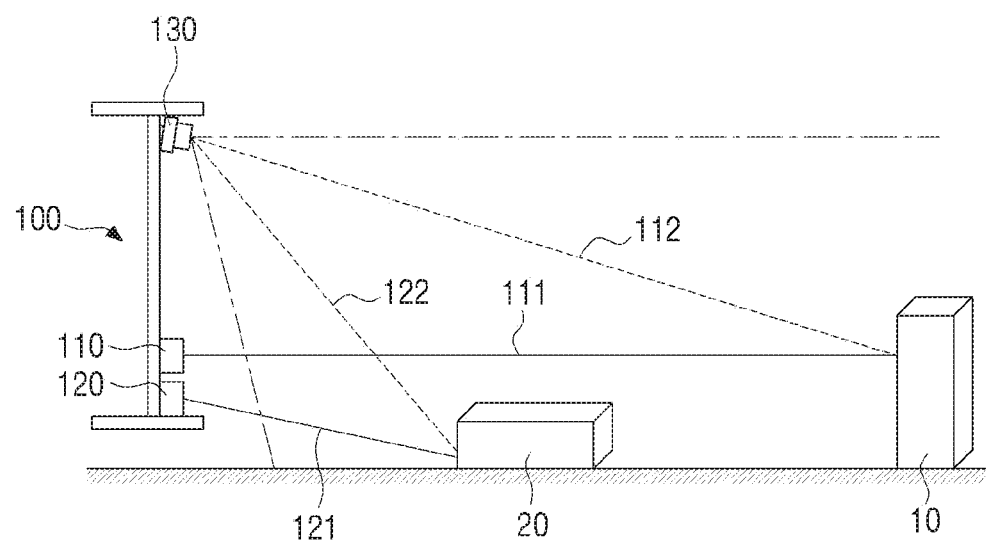
FIG. 1A is a diagram illustrating an electronic apparatus according to an embodiment of the disclosure.

FIG. 1A is a diagram illustrating an electronic apparatus according to an embodiment of the disclosure.

Figure 1B:
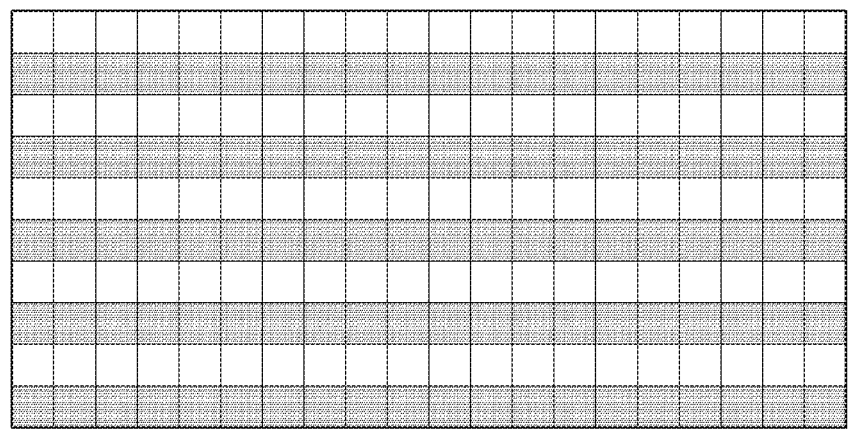
FIG. 1B is a diagram illustrating a sensor according to an embodiment of the disclosure.

FIG. 1B is a diagram illustrating a sensor according to an embodiment of the disclosure.

Referring to FIGS. 1A and 1B, electronic apparatus 100 according to an embodiment of the disclosure may be a movable electronic apparatus. As an example, the electronic apparatus 100 may be an automated driving vehicle that performs driving on behalf of a person, an automated guided vehicle capable of moving goods to a destination, or a robot cleaner capable of performing a cleaning operation while driving a space in a house. However, the embodiment is not limited thereto and the electronic apparatus 100 may be implemented with a variety of electronic apparatuses, such as a robot capable of performing an air cleaning operation while driving in a space of a building, a housework support type robot capable of performing a work such as a clothes arrangement, dish-washing, and the like, while driving in a space of a house, or a guard robot capable of performing a guard work while driving in a space of a building, or the like.

The electronic apparatus 100 may irradiate a plurality of light through a plurality of light sources. The light irradiated by each light source may be, for example, a fan-shaped planar light, but the embodiment is not limited thereto and may be in various forms.

Referring to FIG. 1A, the electronic apparatus 100 may irradiate a first light 111 through a first light source 110 and irradiate a second light 121 through a second light source 120. The first light source 110 may irradiate the first light 111 in a front direction of the electronic apparatus 100, and the second light source 120 may irradiate the second light 121 in a downward direction by a predetermined angle from the front direction of the electronic apparatus 100. In one example, the second light source 120 may irradiate the second light in the downward direction by 30 degrees from the front direction.

The second light source 120 may be located at a lower portion of the first light source 110 as illustrated in FIG. 1A. The first light source 110 and the second light source 120 may be disposed at a left side or a right side at the same height.

Two light sources are illustrated in FIG. 1A, but this is only one embodiment and the number of light sources is not so limited. The electronic apparatus 100 may include three or more light sources. The electronic apparatus 100 may also include one light source. In this example, the electronic apparatus 100 may irradiate two or more lights through a splitter included in the light source. In one example, when the light irradiated by the splitter is two, the first light of the two lights may be irradiated in the front direction of the electronic apparatus 100, and the second light may be irradiated in the downward direction from the front direction of the electronic apparatus 100 by a predetermined angle.

For convenience of description, it is assumed that the electronic apparatus 100 includes two light sources.

When the first light 111 irradiated by the first light source 110 and the second light 121 irradiated by the second light source 120 are reflected by an object, a sensor 130 of the electronic apparatus 100 may receive the first reflected light and the second reflected light. The first reflected light may be light reflected by the object and the second reflected light may be light reflected by the object. For example, referring to FIG. 1A, the sensor 130 may receive the first reflected light 112 when the first light 111 is reflected by the first object 10, and may receive the second reflected light 122 when the second light 121 is reflected by the second object 20. For convenience of description, referring to FIG. 1A, the light irradiated by the light source is illustrated in a solid line form and the reflected light reflected by the object is illustrated in a dotted line, but the shape of the reflected light depends on the type of light.

The sensor 130 may be implemented as an image sensor including a plurality of pixels.

Referring to FIG. 1B, the sensor 130 may be implemented with an image sensor that includes a plurality of pixels. The plurality of pixels may be arranged in a matrix form, and the ratio of the width to height of the plurality of pixels may be 2:1, as illustrated in FIG. 1B, but is not necessarily limited thereto.

Figure 1C:
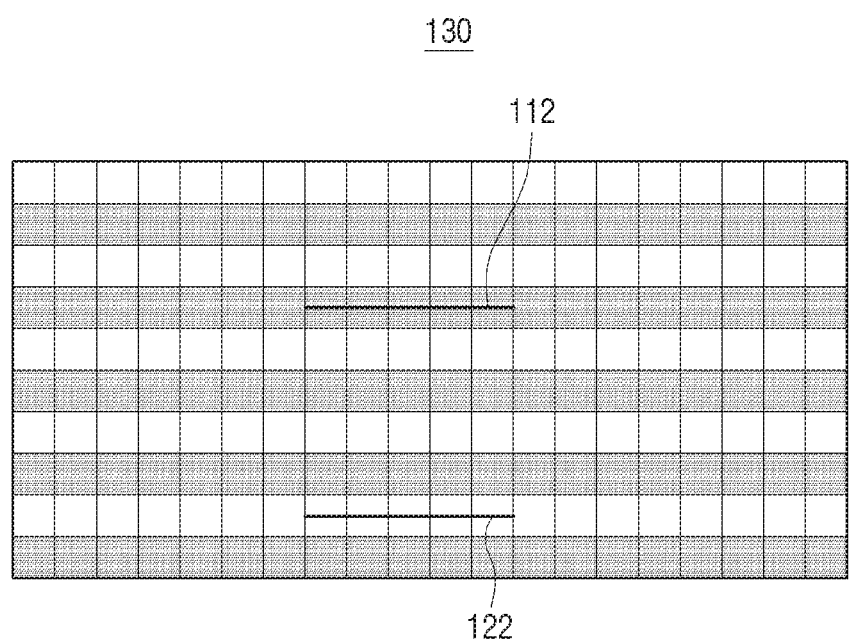
FIG. 1C is a diagram illustrating a sensor receiving a plurality of reflected lights according to an embodiment of the disclosure.

FIG. 1C is a diagram illustrating a sensor receiving a plurality of reflected lights according to an embodiment of the disclosure.

Referring to FIG. 1A, when the first light 111 is reflected by the first object 10 and the second light 121 is reflected by the second object 20, the sensor 130 may receive the first reflected light 121 and the second reflected light 122, as shown in FIG. 1C. In this example, the electronic apparatus 100 may calculate a distance from the first light source 110 to the first object 10 based on the position of the pixels which receive the first reflected light 121, among the plurality of pixels included in the sensor 130, and may calculate a distance from the second light source 120 to the second object 20 based on the position of the pixels which receive the second reflected light 122. This will be described in detail with reference to FIG. 2.

Figure 2:
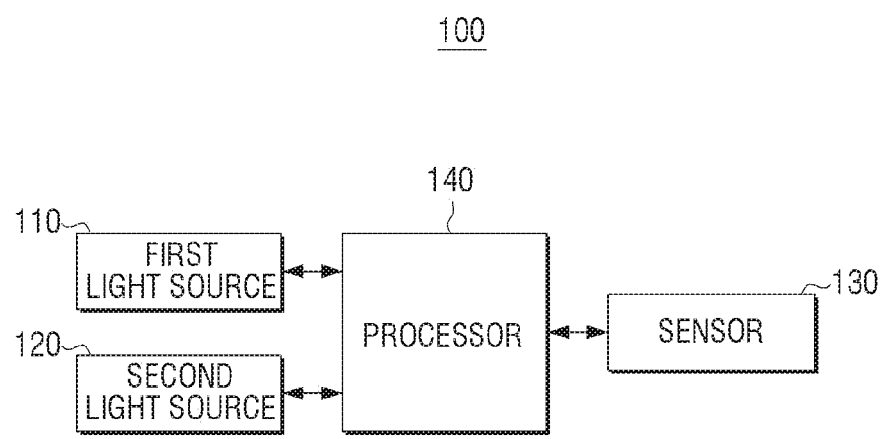
FIG. 2 is a block diagram illustrating an electronic apparatus according to an embodiment of the disclosure.

FIG. 2 is a block diagram illustrating an electronic apparatus according to an embodiment of the disclosure.

Figure 3:
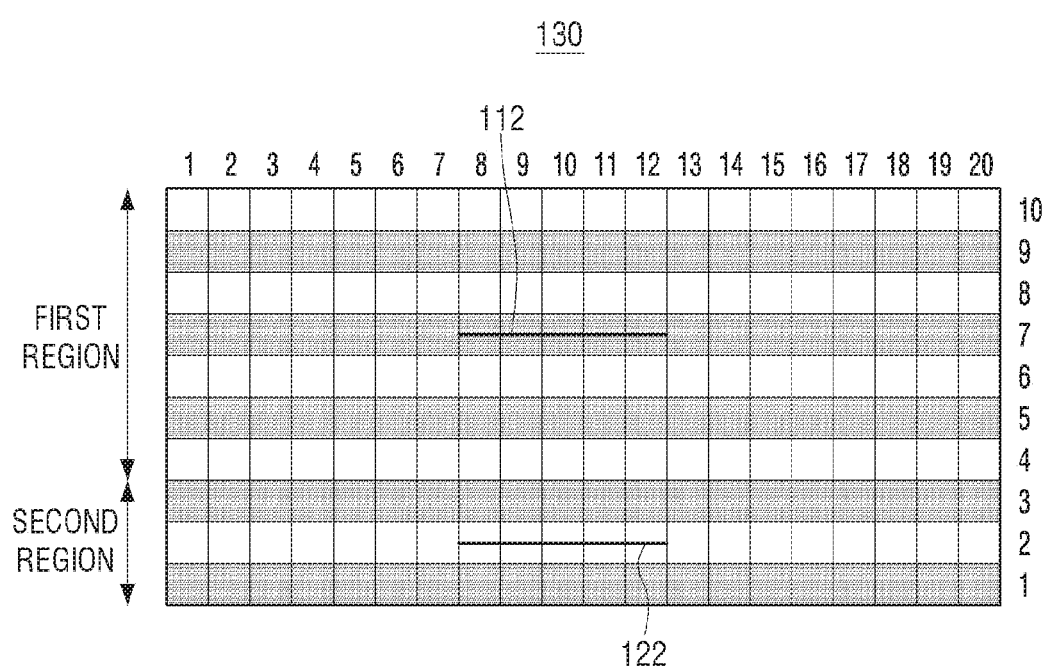
FIG. 3 is a diagram illustrating a sensor according to an embodiment of the disclosure.

FIG. 3 is a diagram illustrating a sensor according to an embodiment of the disclosure.

Referring to FIG. 2, the electronic apparatus 100 includes the first light source 110, the second light source 120, the sensor 130, and a processor 140.

The first light source 110 may irradiate the first light 111. The first light source 110 may irradiate the first light in the front direction of the electronic apparatus 100. The processor 140 may identify an object located remotely from the electronic apparatus 100 and/or an object located nearby based on the first reflected light of the first light.

The second light source 120 may irradiate the second light in a direction different from the first light. The first light source 110 may irradiate the first light in the front direction of the electronic apparatus 100, and the second light source 120 may irradiate the second light in the downward direction by a predetermined angle from the front direction of the electronic apparatus 100. In one example, the second light source 120 may irradiate the second light in the downward direction by 30 degrees from the front direction, but is not necessarily limited thereto. As will be described below, the processor 140 may identify an object that is located at a near distance from the electronic apparatus 100 based on the second reflected light of the second light.

The first light source 110 and the second light source 120 may be implemented as various light sources that may irradiate light such as laser diode, line laser, or the like.

The sensor 130 may be located at an upper portion of the first light source 110. The sensor 130 may receive reflected light of the light irradiated toward the object. The sensor 130 may receive the first reflected light when the first light irradiated by the first light source 110 is reflected by the object, and may receive the second reflected light when the second light irradiated by the second light source 120 is reflected by the object.

The sensor 130 may be implemented as an image sensor that includes a plurality of pixels arranged in a matrix form, as described above. The plurality of pixels may be arranged in a form of M×M or M×N where M and N are integers. For example, referring to FIG. 3, the sensor 130 may be composed of 200 pixels, and 200 pixels may be arranged in ten rows and twenty columns, but are not necessarily limited thereto. However, for convenience of description, the sensor 130 is assumed to be arranged in ten rows and twenty columns, as illustrated in FIG. 3.

When the reflected light is received from the sensor 130, the sensor 130 may sense a pixel that has received the reflected light among the plurality of pixels. Specifically, the sensor 130 may sense a pixel having a brightness greater than or equal to a predetermined brightness value among the plurality of pixels as a pixel that has received the reflected light. The predetermined brightness value may be variously set according to the brightness value of the light irradiated by the light source.

Referring to FIG. 3, a plurality of pixels included in the sensor 130 may be divided into pixels of a first region and pixels in a second region. The first region is a region for calculating a distance from the electronic apparatus 100 to an object located at a distance from the electronic apparatus 100, and the second region may be a region for calculating a distance from the electronic apparatus 100 to an object located at a near distance from the electronic apparatus 100.

A plurality of pixels may be divided into pixels in a first region and pixels in a second region based on pixels of a predetermined row. For example, if the predetermined row is a row 3, the pixels included in a lower row of row 3 including row 3 may be divided into pixels of the first region, and the pixels included in the upper row of row 3 (i.e., rows 4 to row 10) may be divided into pixels in the second region.

The predetermined row may be determined based on a location where reflected light by the light of the second light source 120 may be received at the sensor 130. For example, if the reflected light by the light of the second light source 120 may only be received in pixels included in rows 1 to 3 among the plurality of pixels included in the sensor 130, the predetermined row may be row 3. The position in which the reflected light by the light of the second light source 120 may be received in the sensor 130 may be different according to the embodiment based on the illumination angle of the second light source 120, the angle at which the sensor 130 is inclined in the ground direction, or the like.

The processor 140 may control overall operations of the electronic apparatus 100. The processor 140 may include, for example, and without limitation, one or more of a central processing unit (CPU), an application processor (AP), a communication processor (CP), or the like. The processor 140 may be implemented as at least one of a general processor, a digital signal processor, an application specific integrated circuit (ASIC), a system on chip (SoC), a microcomputer (MICOM), or the like.

The processor 140 may control the first light source 110 to irradiate the first light and control the second light source 120 to irradiate the second light. In this example, when the first light irradiated by the first light source 110 is reflected by the object, the sensor 130 may receive the first reflected light, and if the second light irradiated by the second light source 120 is reflected by the object, the sensor 130 may receive the second reflected light.

The processor 140 may receive information from the sensor 130 regarding the location of the pixels that received the first reflected light and the locations of the pixels that received the second reflected light from among the plurality of pixels included in the sensor 130. When the first and second reflected lights are received, the sensor 130 may sense the brightness of a plurality of pixels included in the sensor 130. The sensor 130 may sense pixels having a brightness greater than or equal to a predetermined brightness value among the plurality of pixels as pixels receiving the first reflected light and pixels receiving the second reflected light, and may transmit information regarding the position of the pixels receiving the first reflected light and the position of the pixels receiving the second reflected light to the processor 140. For example, as shown in FIG. 3, when first reflected light 112 is received at columns 8-12 of row 7, and second reflected light 122 is received in columns 8-12 of row 2, the sensor 130 may transmit, to the processor 140, information that first reflected light 112 is received to columns 8-12 of row 7 and information that second reflected light 122 is received in columns 8-12 of row 2.

The processor 140 may determine (or identify) whether the position of the pixels that received the first reflected light 112 is included in the first region or in the second region. The processor 140 may determine whether the position of the pixels that received the second reflected light 122 is included in the first region or in the second region. In one example, when the processor 140 receives information from the sensor 130 that the first reflected light 112 has been received from the sensor 130 in the columns 8-12 of row 7, since the row which received the first reflected light 112 is low 7 that is upper portion than low 3 which is a predetermined low row and thus, it is determined that the first reflected light 112 is received in the first region. When the processor 140 receives the information from the sensor 130 that the second reflected light 122 has been received in columns 8 to 12 of row 2, the processor 140 may determine that the second reflected light 122 is received in the second region since the row which received the second reflected light 122 is a low which is in a row lower than row 3 that is the predetermined row.

The processor 140 may identify the first reflected light 112 included in the first region as reflected light by the first light, and may identify the second reflected light 122 included in the second region as reflected light by the second light. For example, as shown in FIG. 1A, as the first light 111 is reflected by a first object 10 and the second light 121 is reflected by a second object 20, if the first reflected light 112 and the second reflected light 122 are received in the sensor 130 as illustrated in FIG. 3, the processor 140 may identify the first reflected light 112 included in the first region as reflected light by the first light, and may identify that the second reflected light 122 included in the second region as reflected light by the second light. This is because, as described above, the first region is a region in which reflected light by the second light source 120 may not be received.

The first and second reflected light may be received in the second region. This will be described with reference to FIGS. 6A to 6C.

When the first reflected light 112 by the first light 111 is identified, the processor 140 may calculate a distance from the first light source 110 and the first object 10 reflecting the first light 111 using a first algorithm. When the second reflected light 122 by the second light 121 is identified by the processor 140, the processor 140 may calculate a distance from the second light source 120 to the second object 20 reflecting the first light 121 using a second algorithm. The processor 140 may calculate a first distance from the object that reflects the first light 111 and the electronic apparatus 100 and the second distance from the object that reflects the second light 121 and the electronic apparatus 100 using a different calculation scheme. Hereinafter, for convenience, assuming an example where only the first reflected light 112 is received at the sensor 130, and an example where only the second reflected light 122 is received at the sensor 130, the method of calculating the distance between the electronic apparatus 100 and the object will be described.

Figure 4A:
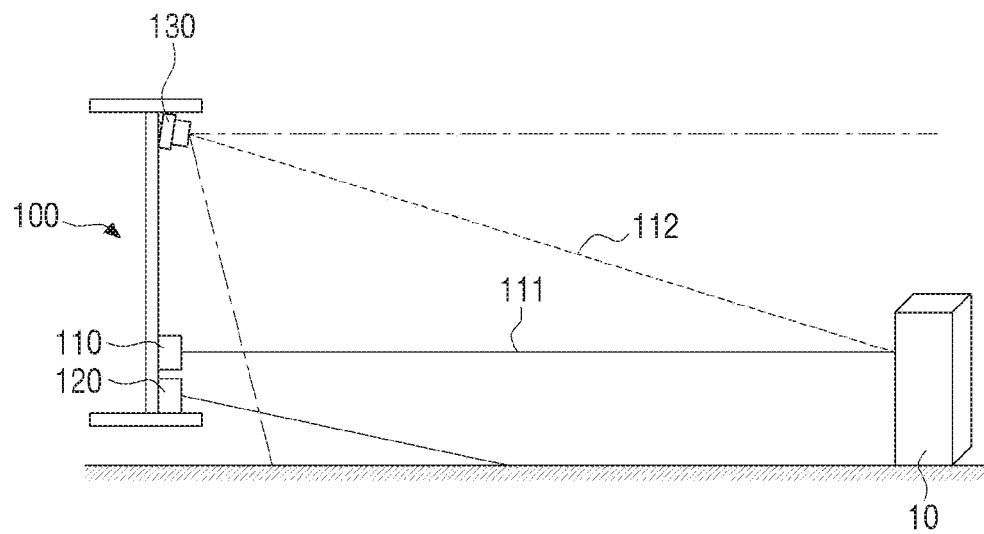
FIG. 4A is a diagram illustrating a case where reflected light is received by light of a first light source according to an embodiment of the disclosure.

FIG. 4A is a diagram illustrating a case where reflected light is received by light of a first light source according to an embodiment of the disclosure.

Figure 4B:
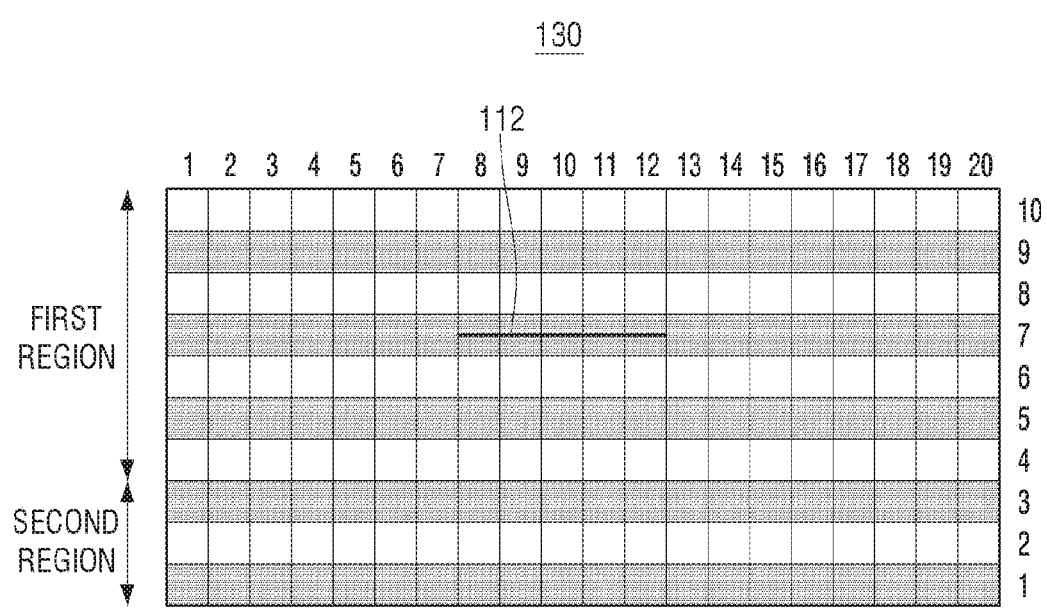
FIG. 4B is a diagram illustrating a sensor receiving reflected light by light of a first light source according to an embodiment of the disclosure.

FIG. 4B is a diagram illustrating a sensor receiving reflected light by light of a first light source according to an embodiment of the disclosure.

Figure 4C:
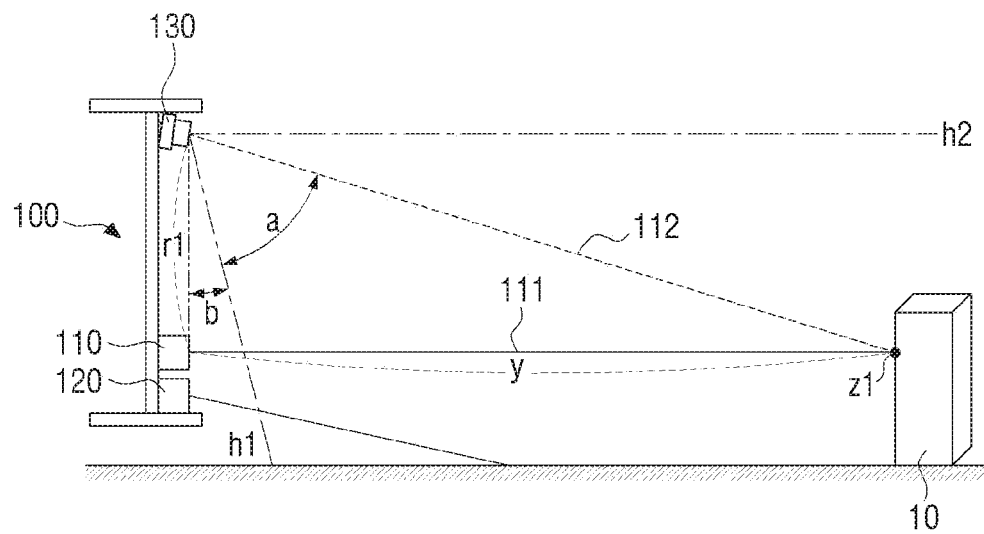
FIG. 4C is a diagram illustrating a method for calculating a distance between an electronic apparatus and an object based on the reflected light by light of the first light source according to an embodiment of the disclosure.

FIG. 4C is a diagram illustrating a method for calculating a distance between an electronic apparatus and an object based on the reflected light by light of the first light source according to an embodiment of the disclosure.

Referring to FIG. 4A, when the first light 111 irradiated by the first light source 110 is reflected by the first object 10, the sensor 130 may receive the first reflected light 112. In this example, when the first reflected light 112 is received, the sensor 130 may sense the brightness of the plurality of pixels included in the sensor 130. The sensor 130 may sense pixels having a brightness greater than or equal to a predetermined brightness value among the plurality of pixels as pixels receiving the first reflected light 112, and transmit the position of the pixels received by the first reflected light 112 to the processor 140. For example, as illustrated in FIG. 4B, the sensor 130 may transmit, to the processor 140, information that the first reflected light 112 has been received at columns 8-12 of row 7.

Accordingly, the processor 140 may determine whether the position of the pixels that receive the first reflected light 112 is included in the first region or in the second region. In one example, when the processor 140 receives information from the sensor 130 that the first reflected light 112 has been received, from the sensor 130, in the columns 8-12 of row 7, since the row in which the first reflected light 112 is received is 7 which is the upper row than row 3 that is a predetermined row, the processor 140 may determine that the first reflected light 112 is received in the first region.

The processor 140 may identify the first reflected light 112 included in the first region as reflected light by the first light. For example, as illustrated in FIG. 1A, as the first light 111 is reflected by the first object 10, when the first reflected light 112 is received by the sensor 130 as illustrated in FIG. 4B, the processor 140 may identify the first reflected light 112 included in the first region as reflected light by the first light. This is because as described above, the first region is a region in which reflected light by the second light source 120 may not be received.

If the first reflected light 112 by the first light 111 is identified, the processor 140 may calculate a distance from the first light source 110 to the first object 10 reflecting the first light 111 using the first algorithm.

The processor 140 may determine the first angle based on the location of the row of pixels that received the first reflected light 112. The processor 140 may determine the first angle by multiplying the row value of the pixels which received the first reflected light 112 by the angle per pixel on the column. For example, as illustrated in FIG. 4B, if the first reflected light 112 is received at the pixels of row 7, and the angle per pixel on the column is 8 degrees, the processor 140 may determine 56 degrees as the first angle.

The angle per pixel on the column may be determined based on the angle range of the sensor 130 and the number of rows forming the plurality of pixels included in the sensor 130. The angle per pixel on the column may be the value of the angle of the sensor 130 divided by the number of rows forming the plurality of pixels. For example, if the range of angle of view of the sensor 130 is 80 degrees (e.g., in the case of FIG. 4C, the angle of view of sensor 130 is the angle between imaginary line H1 and imaginary line H2), and the plurality of pixels included in the sensor 130 are arranged in ten rows as shown in FIG. 4B, the angle per pixel on the column may be eight degrees. The range of view of angle of the sensor 130 may vary depending on the type of lens, or the like, included in the sensor 130.

The determined first angle may be an angle which is formed by a line which connects a point (z1) at which the first light 111 is reflected by the first object 10 and a virtual line h1 according to the minimum angle among the range of angle of view of the sensor 130.

The processor 140 may calculate a distance of the first light source 110 and the first object 10 reflecting the first light 111 using the Equation 1A below.

$$y = r1 \times \tan(a+b)$$ Equation 1A

Here, y is the distance from the first light source 110 and the first object 10, and a is the first angle described above. Here, r1 is the distance between the first light source 110 and the sensor 130, and b is the installation angle of the sensor 130. The distance r1 between the first light source 110 and the sensor 130 and the installation angle b of the sensor 130 may be preset in the electronic apparatus 100. The distance r1 and the angle b may be set in the product manufacturing stage, but may be set according to user manipulation in a diverse manner. When the sensor 130 is installed such that a virtual line according to the minimum angle among the range of angle of view of the sensor 130 is perpendicular to the ground, the angle b may be zero.

Figure 5A:
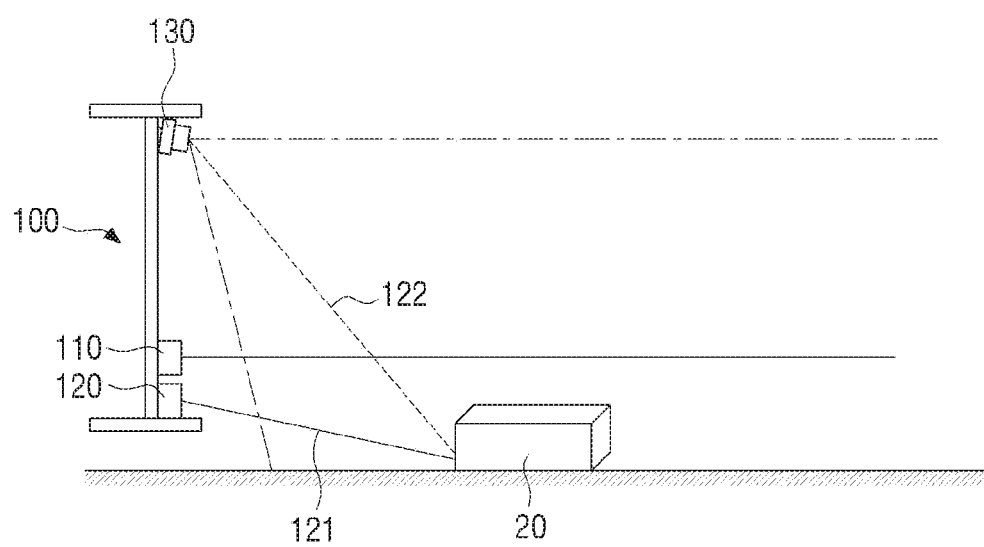
FIG. 5A is a diagram illustrating that reflected light is received by light of a second light source according to an embodiment of the disclosure.

FIG. 5A is a diagram illustrating that reflected light is received by light of a second light source according to an embodiment of the disclosure.

Figure 5B:
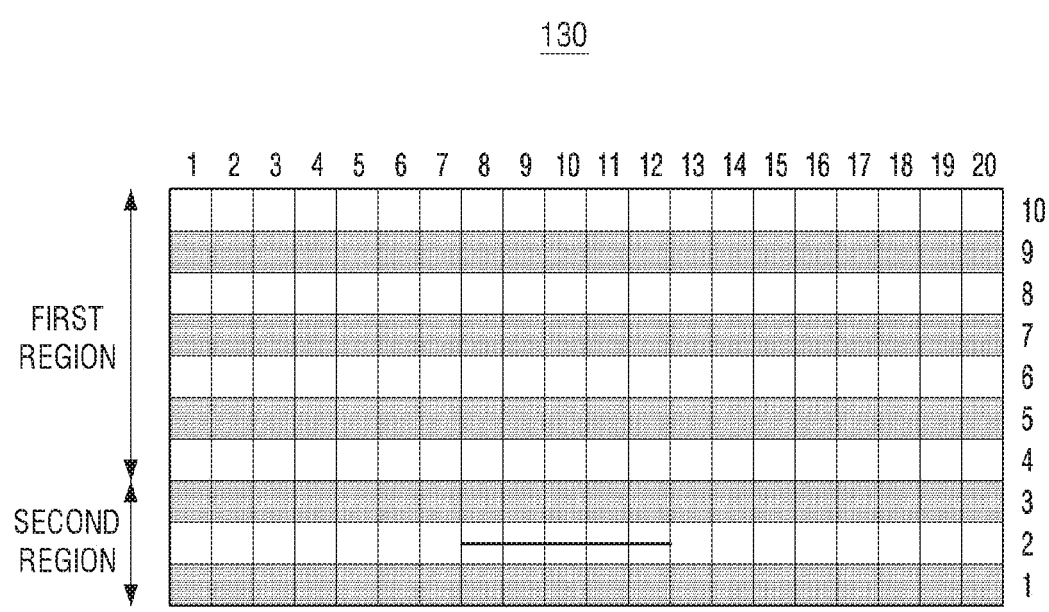
FIG. 5B is a diagram illustrating a sensor receiving reflected light by light of a second light source according to an embodiment of the disclosure.

FIG. 5B is a diagram illustrating a sensor receiving reflected light by light of a second light source according to an embodiment of the disclosure.

Figure 5C:
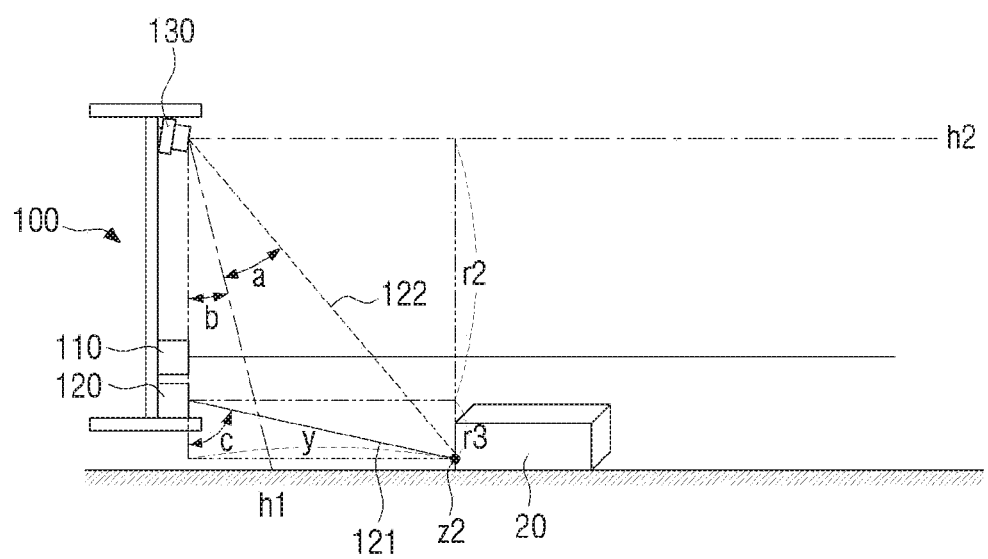
FIG. 5C is a diagram illustrating a method for calculating a distance between an electronic apparatus and an object based on reflected light by light of the second light source according to an embodiment of the disclosure.

FIG. 5C is a diagram illustrating a method for calculating a distance between an electronic apparatus and an object based on reflected light by light of the second light source according to an embodiment of the disclosure.

Referring to FIG. 5A, when the second light 121 irradiated by the second light source 120 is reflected by the second object 20, the sensor 130 may receive the second reflected light 122. In this example, when the second reflected light 122 is received, the sensor 130 may sense the brightness of the plurality of pixels included in the sensor 130. The sensor 130 may sense pixels having a brightness greater than or equal to a predetermined brightness value among the plurality of pixels as pixels that have received the second reflected light 122, and transmit the position of the pixels which received the second reflected light 122 to the processor 140.

Referring to FIG. 5B, the sensor 130 may transmit, to the processor 140, information that the second reflected light 122 has been received at columns 8-12 of row 2.

Accordingly, the processor 140 may determine whether the position of the pixels that received the second reflected light 122 is included in the first region or in the second region. For example, when the processor 140 receives the information from the sensor 130 that the second reflected light 122 has been received from the sensor 130, the processor 140 may determine that the second reflected light 122 is received in the second region because the row received by the second reflected light 122 is row 2 which is lower than the predetermined row 3.

The processor 140 may identify the second reflected light 122 included in the second region as reflected light by the second light. For example, as the second light 121 is reflected by the second object 20 as shown in FIG. 1A, when the second reflected light 122 is received in the second reflected light 122 in the sensor 130 as shown in FIG. 5B, the processor 140 may identify the second reflected light 122 included in the second region as the light reflected by the second light.

When the second reflected light 122 by the second light 121 is identified, the processor 140 may calculate a distance from the second light source 120 to the second object 20 reflecting the second light 121 using the second algorithm.

The processor 140 may determine a second angle based on the location of the row of pixels that received the second reflected light 122. The processor 140 may determine a value obtained by multiplying the row value of the pixels which received the second reflected light 122 by the angle per pixel on the column as the second angle. For example, as shown in FIG. 5B, if the second reflected light 122 is received at the pixels of row 2, and the angle per pixel on the column is 8 degrees, the processor 140 may determine 16 degrees as the second angle.

Referring to FIG. 5C, the second angle determined by the second object 20 may be an angle which is formed by the line connecting the point z2 reflected by the second object 20 and the sensor 130, and the virtual line h1 according to minimum angle among the range of angle of view of the sensor 130.

The processor 140 may calculate the distance to the second light source 120 and the second object 20 reflecting the second light 121 using Equation 2A as shown below:

$$y = r2 \times \tan(a+b) \times \tan(c)/(\tan(c) - \tan(a+b))$$ Equation 2A

Equation 2A may be obtained by combination of Equations 2A-1 and 2A-2 shown below.

$$y = (r2 + r3) \times \tan(a+b)$$ Equation 2A-1

$$y = r3 \times \tan(c)$$ Equation 2A-2

Here, y is the distance from the second light source 120 to the second object 20, and a is the second angle described above. r2 is the distance between the second light source 110 and the sensor 130, b is the installation angle of the sensor 130, and c is the illumination angle of the second light source 120, and r3 is the distance on the vertical axis between the second light source 120 and the point z2 where the second light 121 is reflected by the second object 20. The distance r2 between the second light source 120 and the sensor 130, the installation angle b of the sensor 130, and the irradiation angle c of the second light source 120 may be preset in the electronic apparatus 100. The distance r1, angle b, and angle c may be set in the product manufacturing operation, but may be variously set according to user manipulation without limitation. When the sensor 130 is installed such that the virtual line according to the minimum angle among the range of angle of view of the sensor 130 is installed in a direction perpendicular to the ground, the angle b may be zero.

A method of calculating the distance between the electronic apparatus 100 and the object is described with respect to the case where the reflected light is received in the first region of the sensor 130 and the case where the reflected light is received in the second region of the sensor 130. The above technical idea may be applied even when a plurality of reflected light is received at the sensor 130 as shown in FIG. 3. The processor 140 may calculate a distance between the electronic apparatus 100 and the object by applying the first algorithm to the first reflected light 112 received in the first region, and may calculate a distance between the electronic apparatus 100 and the object by applying the second algorithm to the second reflected light 122 received in the second region. As described above, the distance between the electronic apparatus 100 and the object may be accurately calculated even when a plurality of reflected light is received at the sensor 130, by calculating the distance between the electronic apparatus 100 and the object by dividing regions.

The first and second reflected lights may be received in the second region according to an embodiment. This will be described with reference to FIGS. 6A to 6C.

Figure 6A:
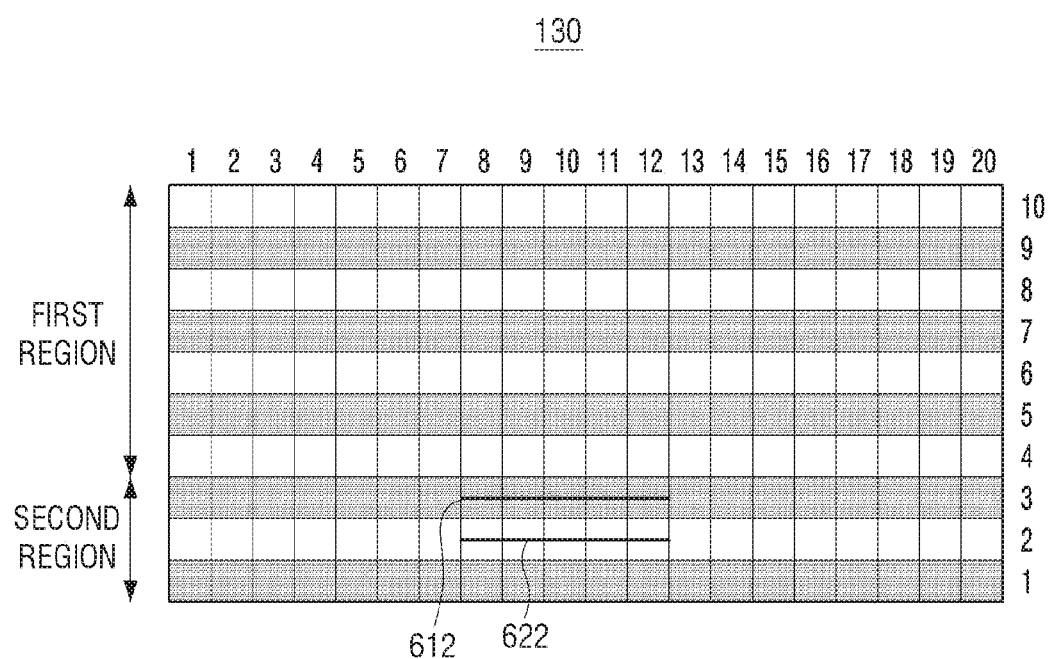
FIG. 6A is a diagram illustrating a sensor receiving a plurality of reflected lights in a second region according to an embodiment of the disclosure.

FIG. 6A is a diagram illustrating a sensor receiving a plurality of reflected lights in a second region according to an embodiment of the disclosure.

Figure 6B:
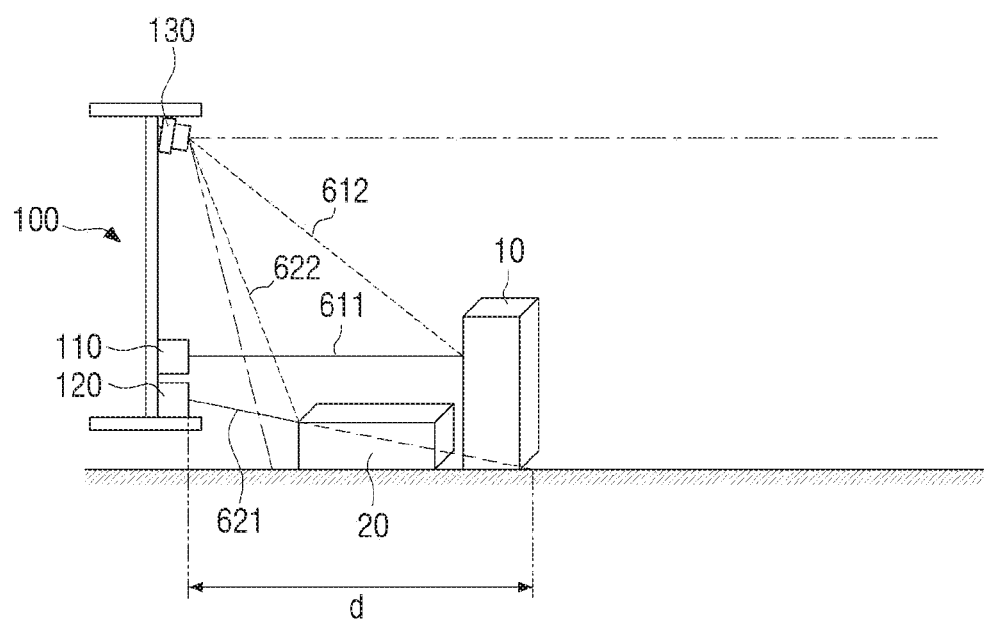
FIG. 6B is a diagram illustrating that a plurality of objects are positioned at a region capable of sensing an object by the second light source according to an embodiment of the disclosure.

FIG. 6B is a diagram illustrating that a plurality of objects are positioned at a region capable of sensing an object by the second light source according to an embodiment of the disclosure.

Figure 6C:
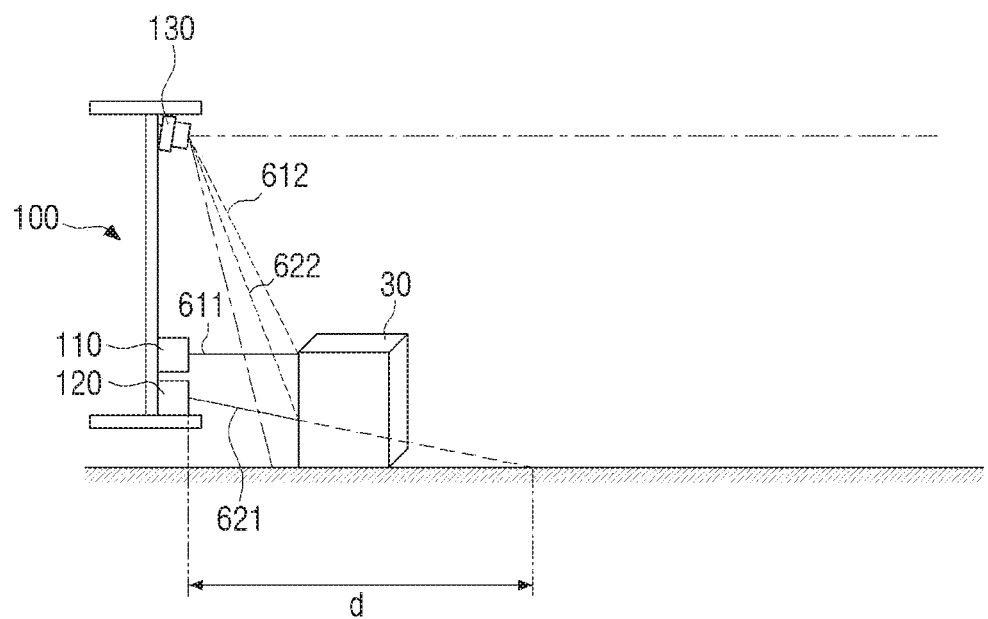
FIG. 6C is a diagram illustrating that an object is positioned in a region capable of sensing an object by the second light source according to an embodiment of the disclosure.

FIG. 6C is a diagram illustrating that an object is positioned in a region capable of sensing an object by the second light source according to an embodiment of the disclosure.

Referring to FIG. 6A, the sensor 130 may receive a first reflected light 612 and a second reflected light 622 in the second region.

This may be a one of a case as illustrated in FIG. 6B that within the distance d (i.e., within the range in which light irradiated from the second light source 120 can reach the ground), the first object 10 in a size where the light irradiated from the first light source 110 may reach or the second object 20 in a size where the light irradiated from the second light source 120 can reach are located, or a case as illustrated in FIG. 6C that a third object 30 in a size where the light irradiated from the first light source 110 and the light irradiated from the second light source 120 may reach within the distance d.

In the latter case, if a distance is calculated by applying the second algorithm to each of the first reflected light 612 and the second reflected light 622 on the ground that the reflected light is received in the second region, the electronic apparatus may recognize that the first object 10 and the second object 20 exist at different positions. Thus, when a plurality of reflected light is received in the second region, it is necessary to distinguish whether a plurality of reflected light is reflected by one object or reflected by a plurality of objects.

The processor 140 may identify the reflected light by the first light 611 and the reflected light by the second light 621, among the first and second reflected lights 612 and 622 received in the second region. The processor 140 may identify the first reflected light 612 received at the pixels located in a relatively upper row among the plurality of pixels that received the first and second reflected light 612, 622 as reflected light by the first light 611 and may identify the second reflected light 622 received at the pixels located in the relatively lower row as reflected light by the second light 621. This is because, by a geometric structure in which the first light source 110 is arranged in the vertical direction of the second light source 120, the reflected light by the first light 611 may be received in the pixels located in the relatively lower row, and the reflected light by the second light 621 may be received in the pixels located in the relatively lower row.

The processor 140 may calculate the first distance by applying the first algorithm described above to the first reflected light 612, which is reflected by the first light 611. The processor 140 may determine the first angle based on the location of the row of pixels that received the first reflected light 612, and apply the first algorithm to the first angle, the installation angle of the sensor 130, and the distance from the first light source 110 to the sensor 130 to calculate the first distance. For example, as illustrated in FIG. 6A, if the first reflected light 612 is received at the pixels of row 3, and the angle per pixel on the column is 8 degrees, the processor 140 may determine 24 degrees as the first angle.

Equation 1B to calculate the first distance is as shown below:

$$y1 = r1 \times \tan(a+b)$$ Equation 1B

Here, y1 is the first distance that is the distance from the first light source 110 to the object that reflects the first light, a is the first angle described above, r1 is the distance between the first light source 110 and the sensor 130, and b is the installation angle of the sensor 130. The distance r1 between the first light source 110 and the sensor 130 and the installation angle b of the sensor 130 may be preset in the electronic apparatus 100 as described above.

The processor 140 may calculate the second distance by applying the second algorithm described above to the second reflected light 622, which is reflected by the second light 621. The processor 140 may determine the second angle based on the position of the row of pixels that received the second reflected light 622, apply the second algorithm to the second angle, the installation angle of the sensor 130, the illumination angle of the second light source 120, and the distance from the second light source 120 to the sensor 130 to calculate the second distance. For example, as illustrated in FIG. 6A, if the second reflected light 622 is received at the pixels of row 2, and the angle per pixel on the column is 8 degrees, the processor 140 may determine 16 degrees as the second angle.

Equation 2B to calculate the second distance is as shown below:

$$y2 = r2 \times \tan(a+b) \times \tan(c)/(\tan(c) - \tan(a+b)) \quad \text{Equation 2B}$$

Here, y2 is the second distance that is the distance from the second light source 120 to the object that reflects the second light, and a is the second angle described above. In addition, r2 is the distance between the second light source 110 and the sensor 130, and b is the installation angle of the sensor 130. c is the illumination angle of the second light source 120, and r3 is the distance on the vertical axis between the point at which the second light 121 is reflected by the second object 20 and the second light source 120. The distance r2 between the second light source 120 and the sensor 130, the installation angle b of the sensor 130, and the irradiation angle c of the second light source 120 may be preset in the electronic apparatus 100.

If the columns of pixels receiving the first reflected light 612 and the columns of pixels receiving the second reflected light 622 match in at least a part, the processor 140 may calculate the first and second distances described above. For example, as illustrated in FIG. 6A, as the example where the columns of pixels that received the first reflected light 612 are 8 to 12 and the columns of pixels that received the second reflected light 622 are 8 to 12, if the columns of pixels that received the first reflected light 612 and the columns of pixels that received the second reflected light 622 match, the first and second distances described above may be calculated.

The case where there is no matching part among the columns that received the reflect light may indicate that the first and second reflected lights are received at different positions in the horizontal direction with respect to the electronic apparatus 100, and each of the first and second reflected lights may be viewed as reflected by different objects. In this example, the processor 140 may calculate a distance between the first light source 110 and the first object and a distance between the second light source 120 and the second object by applying the second algorithm described above to each of the first and second reflected lights. The processor 140 may calculate a first distance through the first algorithm and calculate a second distance through the second algorithm if the plurality of reflected light is received in the second region and the columns of the plurality of reflected light received in the second region match at least in part. Accordingly, any unnecessary operation of the processor 140 may be prevented.

The processor 140 may identify whether the object reflecting the first light and the object reflecting the second light are the same object or different objects based on a difference between the first and second distances calculated through the above-described method. If the difference between the calculated first and second distances is less than or equal to a predetermined value, the processor 140 may identify that the object reflecting the first light 611 and the object reflecting the second light 621 are the same object 30. For example, if the difference between the calculated first and second distances is the same, as shown in FIG. 6C, the processor 140 may identify that the object that reflects the first light 611 and the object that reflects the second light 621 are the same object 30. If the difference between the calculated first and second distances exceeds a predetermined value, the processor 140 may identify that the object 10 reflecting the first light 611 and the object 20 reflecting the second light 621 are different objects. For example, if it is determined that the difference between the calculated first and second distances is greater than or equal to one meter (1 m), the processor 140 may identify that the object 10 reflecting the first light 611 and the object 20 reflecting the second light 621 are different objects, as shown in FIG. 6B. Here, 1 m is merely exemplary, and a predetermined value may be set in a diverse manner such as 50 cm, 2 m, or the like.

The processor 140 may then perform different operations, depending on whether the object reflecting the first light and the object reflecting the second light are the same object or different objects. In one example, if it is determined that the object reflecting the first light and the object reflecting the second light are the same third object 30, the processor 140 may control the electronic apparatus 100 to drive while avoiding the third object 30 at the first distance (this is the same as the second distance), and if it is determined that the object reflecting the first light is the first object 10 and the object reflecting the second light is the second object 20, the processor 140 may control the electronic apparatus 100 to drive while avoiding the first object 10 at the first distance and drive while avoiding the second object 20 at the second distance.

It has been described above that the farther from the electronic apparatus 100, the reflected light is received at an upper portion of the sensor 130, and the nearer from the electronic apparatus 100, the reflected light may be received at an upper portion of the sensor 130. In this case, it is considered that a technical idea similar to that of the above-described technical idea may be applied. In this example, the reflected light received in a relatively upper row among reflected light received in the second region may be identified as reflected light by the second light, and the reflected light received in the relatively lower row may be identified as reflected light by the first light.

It is described that the reflected light received in the relatively higher row is identified as reflected light by the first light among the reflected light received in the second region based on the geometric structure of the first light source 110 and the second light source 120, and that the reflected light received is received at a relatively lower low is identified as the reflected light by the second light, but the reflected light by the first light and the reflected light by the second light may be identified by various methods. This will be described later with reference to FIGS. 8A through 11.

Figure 7:
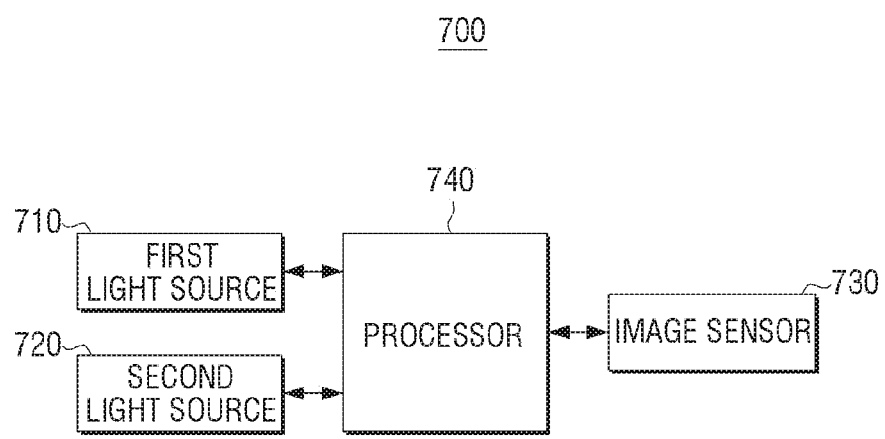
FIG. 7 is a block diagram illustrating a sensor according to an embodiment of the disclosure.

FIG. 7 is a block diagram illustrating a sensor according to an embodiment of the disclosure.

Referring to FIG. 7, a sensor 700 may include a first light source 710, a second light source 720, an image sensor 730, and a processor 740. The sensor 700 may be included in the electronic apparatus 100 described above. The image sensor 730 may include a plurality of pixels. Although not shown in FIG. 7, the sensor 700 may further include a lens for receiving reflected light.

The first light source 710 may perform a function same as the first light source 110. The first light source 710 may irradiate the first light in a front direction of the electronic apparatus 100.

The second light source 720 may perform the same function as the second light source 120. The second light source 720 may irradiate the second light in a direction different from the first light. For example, the second light source 720 may be disposed lower than the first light source 710, and may irradiate the second light from the front direction of the electronic apparatus 100 in the downward direction by 30 degrees, but is not necessarily limited thereto.

The first light source 710 and the second light source 720 may be implemented as various light sources that may irradiate light such as laser diode, line laser, or the like.

The image sensor 730 may be located in an upper portion of the first light source 710. The image sensor 730 may receive the reflected light of the light irradiated toward the object. The image sensor 730 may receive the first reflected light when the first light irradiated by the first light source 710 is reflected by the object, and may receive the second reflected light when the second light irradiated by the second light source 720 is reflected by the object.

The plurality of pixels included in the image sensor 730 may be arranged in a matrix form. A plurality of pixels may be arranged in the form of M×M or M×N where M, N are integers. In one example, the image sensor 730 may be composed of 200 pixels, and 200 pixels may be arranged in ten rows and 20 columns, but are not necessarily limited thereto.

The image sensor 730 may be divided into pixels of a first region and pixels in a second region. The first region is a region for calculating a distance from the electronic apparatus 100 to an object located at a far distance from the electronic apparatus 100, and the second region may be a region for calculating a distance from the electronic apparatus 100 to an object located at a near distance from the electronic apparatus 100.

The image sensor 730 may be divided into pixels of a first region and pixels in a second region based on pixels of a predetermined row. For example, if the predetermined row is row 3, the pixels included in row 3 equal to or lower than the row 3 including the row 3 (i.e., row 1 to row 3) may be divided into pixels of the first region, and the pixels included in the row equal to or upper than row 3 (that is, rows 4 to row 10) may be divided into pixels in the second region.

The predetermined row may be determined based on a location where the reflected light by the second light source 720 may be received at the image sensor 730. For example, if the reflected light by the second light source 720 may be received only in pixels included in rows 1 to 3 of the plurality of pixels 730, the predetermined row may be row 3. The position where the reflected light by the second light source 720 may be received in the image sensor 730 may be different according to the embodiment based on the illumination angle of the second light source 720, the angle at which the sensor 130 is inclined in the ground direction, and the like.

The processor 740 may control overall operations of the sensor 700. The processor 740 may include, for example, and without limitation, one or more of a central processing unit (CPU), an application processor (AP), a communication processor (CP), or the like. The processor 740 may be implemented as at least one of a general processor, a digital signal processor, an application specific integrated circuit (ASIC), a system on chip (SoC), a microcomputer (MICOM), or the like.

When the reflected light is received by the processor 740, the processor 740 may sense a pixel that has received the reflected light among the plurality of pixels. The processor 740 may sense a pixel having a brightness greater than or equal to a predetermined brightness value among the plurality of pixels as a pixel that has received the reflected light. The predetermined brightness value may be variously set according to the brightness value of the light illuminated by the light source.

The processor 740 may receive information from the image sensor 730 regarding the location of the pixels that received the first reflected light and the locations of the pixels that received the second reflected light from among the plurality of pixels included in the image sensor 730. When the first and second reflected lights are received, the image sensor 730 may sense the brightness of the plurality of pixels included in the image sensor 730. The image sensor 730 may sense pixels having a brightness greater than or equal to a predetermined brightness value among the plurality of pixels as pixels receiving the first reflected light and pixels receiving the second reflected light, and transmit information regarding the position of the pixels receiving the first reflected light and the position of the pixels receiving the second reflected light to the processor 740.

The processor 740 may determine whether the position of the pixels receiving the first reflected light is included in the first region or the second region. The processor 740 may determine whether the position of the pixels receiving the second reflected light is included in the first region or the second region.

The processor 740 may identify the first reflected light included in the first region as the reflected light by the first light and identify the second reflected light included in the second region as the reflected light by the second light. As described above, the first region is the region where the reflected light by the second light source 720 may not be received.

When the first reflected light by the first light is identified by the processor 740, the processor 740 may calculate a distance between the first light source and the first object reflecting the first light using the first algorithm. When the second reflected light by the second light is identified by the processor 740, the processor 740 may calculate a distance from the second light source to the second object reflecting the first light using the second algorithm. The processor 740 may calculate a first distance between the electronic apparatus 100 and the object that reflects the first light and a second distance from the electronic apparatus to the object that reflects the second light using a different calculation scheme. The description of the first and second algorithms is described above, and will therefore be omitted.

When the first reflected light and the second reflected light are received in the second region of the image sensor 730, the processor 740 may identify the reflected light by the first light and the reflected light by the second light among the first and second reflected light based on the position of the first pixels which received the first reflected light and the position of the second pixels which received the second reflected light.

The processor 740 may identify the reflected light received in the pixels located at a relatively upper row, among the plurality of pixels, as the reflected light by the first light, and may identify the reflected light received in the pixels located at a relatively lower row as the reflected light by the second light.

The processor 740 may calculate a first distance by applying the first algorithm described above to the first reflected light, which is a reflected light by the first light. The processor 740 may determine the first angle based on the location of the row of pixels that received the first reflected light, apply the first algorithm to the first angle, the installation angle of the image sensor 730, and the distance from the first light source 710 to the image sensor 730 to calculate the first distance. For example, if the first reflected light is received at the pixels of row 3, and the angle per pixel on the column is 8 degrees, the processor 740 may determine 24 degrees as the first angle.

Equation 1C to calculate the first distance is as shown below:

$$y1 = r1 \times \tan(a+b) \qquad \text{Equation 1C}$$

Here, y1 is the first distance from the first light source 710 and the object that reflects the first light, and a is the first angle described above. In addition, r1 is the distance between the first light source 710 and the image sensor 730, and b is the installation angle of the image sensor 130. The distance r1 between the first light source 710 and the image sensor 730 and the installation angle b of the image sensor 730 may be preset in the sensor 700.

The processor 740 may calculate the second distance by applying the second algorithm described above to the second reflected light, which is reflected by the second light. The processor 740 may determine the second angle based on the position of the row of pixels that received the second reflected light, apply the second algorithm to the second angle, the installation angle of the image sensor 730, the illumination angle of the second light source 720, and the distance from the second light source 720 to the image sensor 730 to calculate the second distance. As an example, if the second reflected light is received at the pixels of row 2, and the angle per pixel on the column is 8 degrees, the processor 740 may determine 16 degrees as the second angle.

Equation 2C to calculate the second distance is as shown below:

$$y2 = r2 \times \tan(a+b) \times \tan(c)/(\tan(c) - \tan(a+b)) \qquad \text{Equation 2C}$$

Here, y2 is the second distance that is the distance from the second light source 720 to the object that reflects the second light, a is the second angle described above, r2 is the distance between the second light source 710 and the image sensor 730, and b is the installation angle of the image sensor 730. c is the illumination angle of the second light source 720, and r3 is the distance on the vertical axis between the point at which the second light is reflected by the second object and the second light source 720. The distance r2 between the second light source 720 and the image sensor 730, the installation angle b of the image sensor 730, and the irradiation angle c of the second light source 720 may be preset in the sensor 700.

If the columns of pixels receiving the first reflected light and the columns of pixels receiving the second reflected light match in at least a part, the processor 740 may calculate the first and second distances described above. For example, as in the case where the columns of pixels that received the first reflected light are 6 to 12 and the columns of pixels that received the second reflected light are 8 to 12, if the columns of pixels that received the first reflected light 612 and the columns of pixels that received the second reflected light 622 match at least in part, the first and second distances described above may be calculated.

If there is no matched part in the columns receiving the reflected light, the first and second reflected light are received at different positions in the horizontal direction with respect to the electronic apparatus 100, and each of the first and second reflected light may be viewed as reflected by different objects. In this example, the processor 740 may apply the second algorithm described above to each of the first and second reflected lights to calculate a distance between the first light source 710 and the first object and a distance from the second light source 720 to the second object. The processor 740 may calculate a first distance through the first algorithm and calculate a second distance through the second algorithm if a plurality of reflected light is received in the second region and the columns of the plurality of reflected light received in the second region match at least in part. Accordingly, an unnecessary operation of the processor 740 may be prevented.

The processor 740 may identify whether the object reflecting the first light and the object reflecting the second light are the same object or different objects based on a difference between the first and second distances calculated through the above-described method. The processor 740 may identify that the object reflecting the first light and the object reflecting the second light are the same object if the difference between the calculated first and second distances is less than or equal to a predetermined value. If the calculated difference between the first and second distances exceeds a predetermined value, the processor 740 may identify that the object reflecting the first light and the object reflecting the second light are different objects. For example, if it is determined that the calculated difference between the first and second distances is greater than or equal to 1 m, the processor 740 may identify that the object reflecting the first light and the object reflecting the second light may be identified as being different objects. 1 m is merely exemplary and a predetermined value may be set in a diverse manner, such as 50 cm, 2 m, or the like.

Figure 8A:
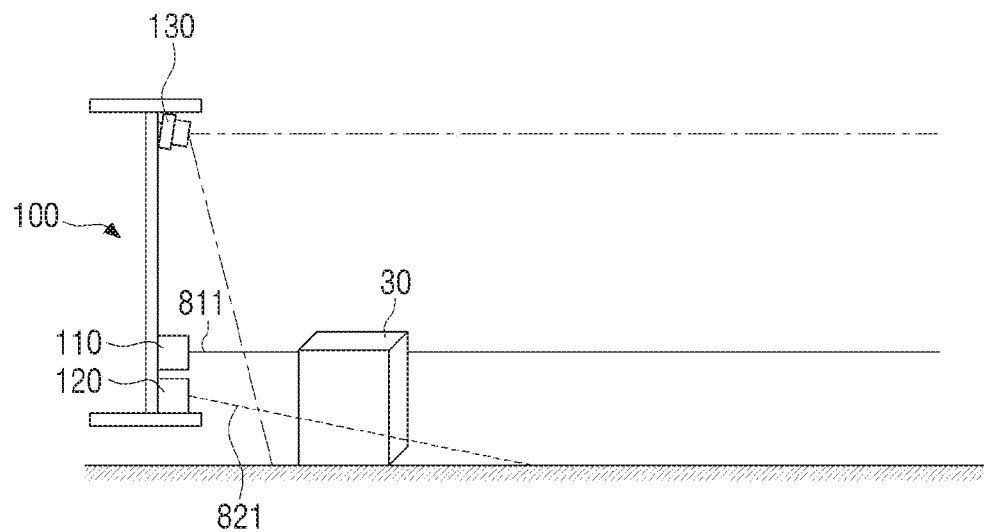
FIG. 8A is a diagram illustrating an embodiment of irradiating light of different patterns by a plurality of light sources according to an embodiment of the disclosure.

FIG. 8A is a diagram illustrating an embodiment of irradiating light of different patterns by a plurality of light sources according to an embodiment of the disclosure.

Figure 8B:
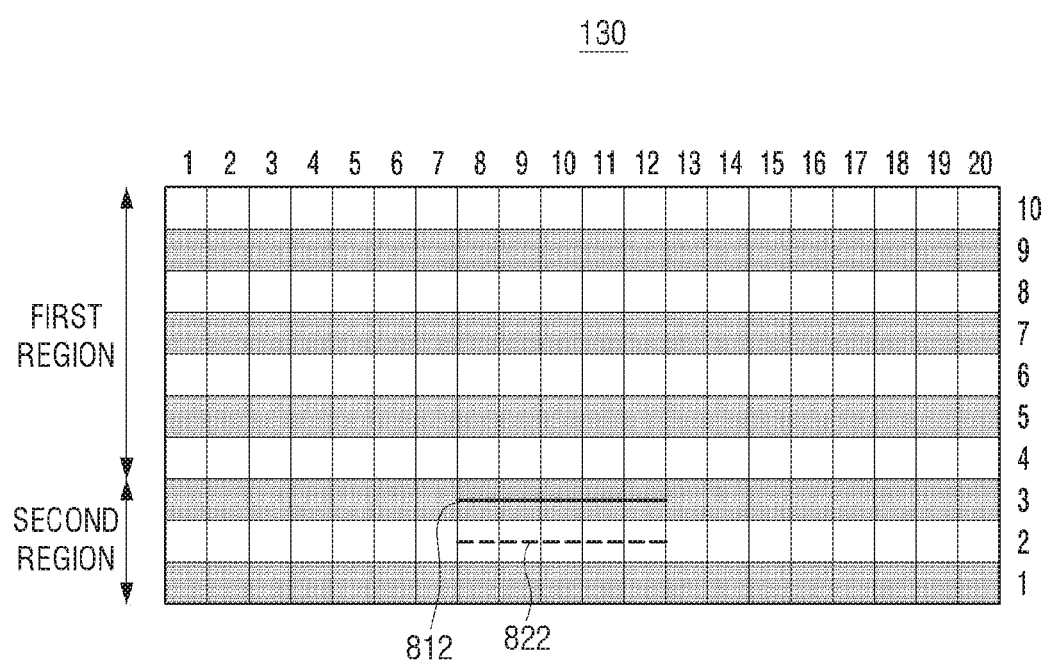
FIG. 8B is a diagram illustrating a sensor receiving a plurality of lights of different patterns according to an embodiment of the disclosure.

FIG. 8B is a diagram illustrating a sensor receiving a plurality of lights of different patterns according to an embodiment of the disclosure.

Referring to FIG. 8A, the first light source 110 according to an embodiment may irradiate a first light 811 in a solid line pattern, and the second light source 120 may irradiate a second light 821 in a dotted line pattern. For this purpose, a film to irradiate the dotted line pattern may be attached to the second light source 120.

Referring to FIG. 8B, the sensor 130 may receive a first reflected light 812 in a solid line pattern and a second reflected light 822 in a dotted line pattern.

The processor 140 may identify, based on the pattern of reflected light, reflected light by the first light 811 and reflected light by the second light 821 from among the plurality of reflected light. The processor 140 may identify the first reflected light 812 having the same pattern as the pattern of the first light 811 as the reflected light by the first light 811, and identify the second reflected light 822 having the same pattern as the dotted line pattern of the second light 821 as the reflected light by the second light 812.

The processor 140 may apply the first algorithm to the first reflected light 812 to calculate a first distance, apply the second algorithm to the second reflected light 822 to calculate a second distance, and determine whether the first and second reflected lights 812, 822 are light reflected by the same object or light reflected by different objects, as described above. Since the detailed description thereof has been described above, a detailed description thereof will be omitted.

It has been described that the first light 811 is in the sold line pattern and the second light 821 is in the dotted line pattern, and the pattern of the first light 811 and the pattern of the second light 821 may be various patterns that are different from each other.

Figure 9A:
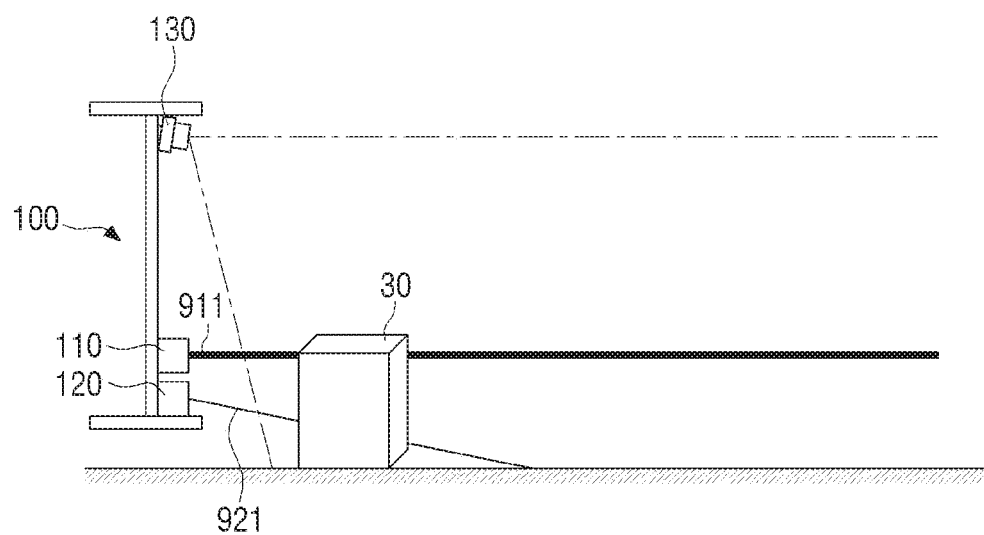
FIG. 9A is a diagram illustrating an embodiment of irradiating light of thickness by a plurality of light sources according to an embodiment of the disclosure.

FIG. 9A is a diagram illustrating an embodiment of irradiating light of thickness by a plurality of light sources according to an embodiment of the disclosure.

Figure 9B:
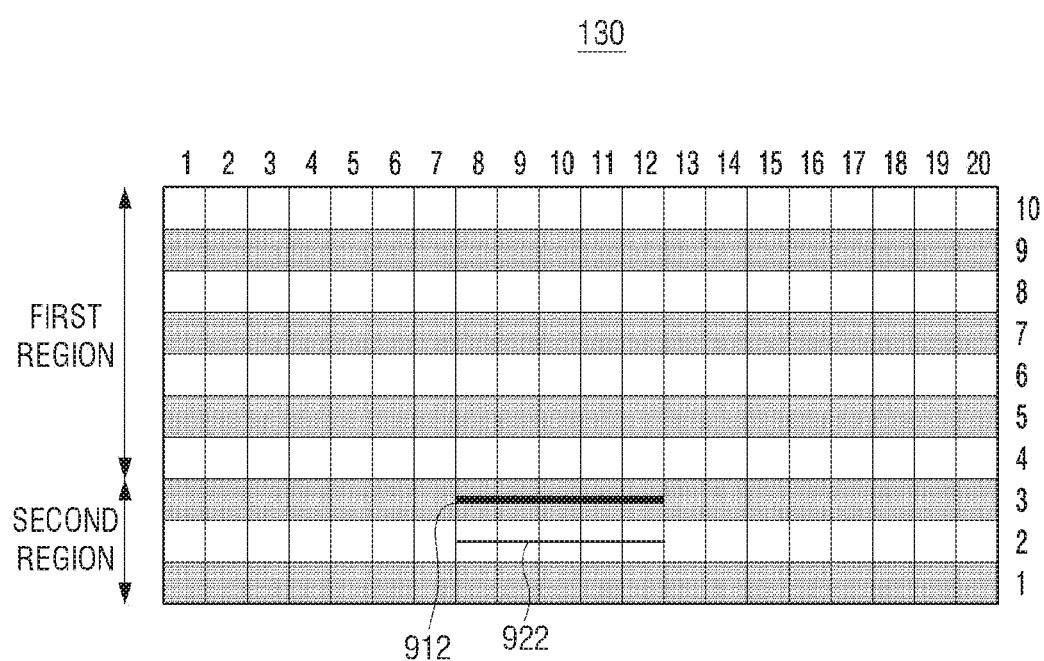
FIG. 9B is a diagram illustrating a sensor receiving a plurality of lights having different thickness according to an embodiment of the disclosure.

FIG. 9B is a diagram illustrating a sensor receiving a plurality of lights having different thickness according to an embodiment of the disclosure.

Referring to FIG. 9A, the first light source 110 according to an embodiment may irradiate first light 911 in the first thickness, and the second light source 120 may irradiate second light 921 in the second thickness. The first thickness may be thicker than the second thickness, but it is not limited thereto and the second thickness may be thicker than the first thickness. The size of the diode irradiating the light included in the first light source 110 may be larger than the size of the diode that irradiates light included in the second light source 120.

The sensor 130 may receive the first reflected light 912 in the first thickness and the second reflected light 922 in the second thickness as illustrated in FIG. 9B.

The processor 140 may identify, based on the thickness of the reflected light, the reflected light by the first light 911 and the reflected light by the second light 921 from among the plurality of reflected light. The processor 140 may identify the first reflected light 912 having the same thickness as that of the first light 811 as reflected light by the first light 811, and identify the second reflected light 922 having the same thickness as that of the second light 821 as reflected light by the second light 912.

The processor 140 may apply the first algorithm to the first reflected light 912 to calculate a first distance, apply the second algorithm to the second reflected light 922 to calculate a second distance, and determine whether the first and second reflected lights 912, 922 are light reflected by the same object or light reflected by different objects, as described above. Since the detailed description thereof has been described above, a detailed description thereof will be omitted.

Although the embodiment of identifying the reflected light by the first light 911 and the reflected light by the second light 921 is described herein based on the thickness of the reflected light, the disclosure may identify the reflected light by the first light and the reflected light by the second light based on the brightness of the reflected light. As an example, the first light source 110 may irradiate a first light of a first brightness, and the second light source 120 may irradiate a second light of a second brightness. The first brightness may be brighter than the second brightness, but it is not limited thereto and the second brightness may be brighter than the first brightness. For this purpose, a diode capable of irradiating light of a first brightness may be included in the first light source 110, and a diode capable of irradiating light of a second brightness may be included in the second light source 120.

FIG. 10 is a diagram illustrating an embodiment of identifying reflected light by first light source and reflected light by second light source using information on a thickness of reflected light according to an embodiment of the disclosure.

Referring to FIG. 10, the electronic apparatus 100 may store information on the thickness of the reflected light by the first light source divided by the distance and information on the thickness of the reflected light by the second light source. The information regarding the thickness of the reflected light by the first light source is information matched with the thickness of the reflected light by the first light source received at the sensor 130, for each distance between the electronic apparatus 100 and the object, and the information on the thickness of the reflected light by the second light source may be information matching the thickness of the reflected light by the second light source received at the sensor 130, for each distance between the electronic apparatus 100 and the object.

The processor 140 may identify the reflected light by the first light irradiated from the first light source 110 and the reflected light by the second light irradiated from the second light source 120 among a plurality of reflected lights reflected to the sensor 112 based on the information on the thickness of the first and second reflected lights.

The processor 140 may apply the second algorithm described above to the plurality of reflected light included in the second region to determine a second distance that is the distance between the electronic apparatus 100 and the object. The processor 140 may determine the thickness of the reflected light matched to the second distance based on information on the thickness of the reflected light by the second light source as shown in FIG. 10. In one example, when the second distance is determined to be 3 m, the processor 140 may determine 0.3 mm as the thickness of the reflected light matched to the second distance based on information regarding the thickness of the reflected light by the second light source. If the thickness of the reflected light received by the sensor 130 may match the thickness of the reflected light matched with the second distance, the processor 140 may determine that the reflected light is the reflected light by the second light source 120, and if the thickness does not match, the processor 140 may determine that the reflected light is reflected light by the first light source 110. For example, if it is determined that the thickness of the reflected light determined on the basis of the information on the thickness of the reflected light by the second light source is 0.3 mm, but the thickness of the actual reflected light received by the sensor 130 is determined to be 0.2 mm, the processor 140 may determine that the reflected light is by the first light source 110. In this example, the processor 140 may apply the first algorithm to the reflected light again to calculate the distance between the electronic apparatus 100 and the object. If the thickness of the actual reflected light received by the sensor 130 is 0.3 mm and the thickness of the reflected light determined on the basis of the information on the thickness of the reflected light by the second light source is 0.3 mm, the processor 140 may determine that the reflected light is reflected by the second light source 110.

Figure 11:
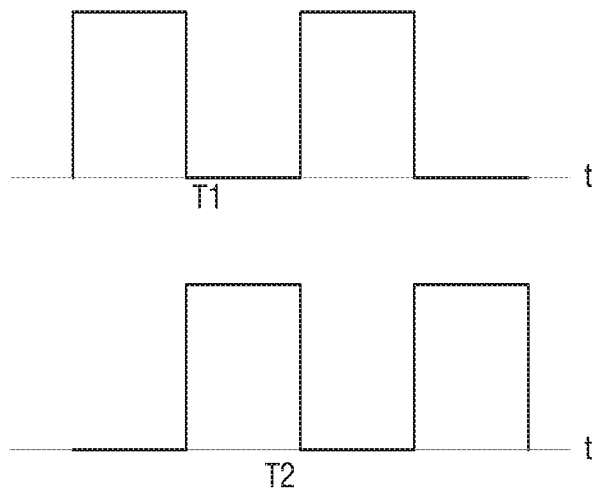
FIG. 11 is a diagram illustrating an embodiment of identifying reflected light by the first light source and reflected light by the second light source based on a cycle according to an embodiment of the disclosure.

FIG. 11 is a diagram illustrating an embodiment of identifying reflected light by the first light source and reflected light by the second light source based on a cycle according to an embodiment of the disclosure.

Referring to FIG. 11, the first light source 110 and the second light source 120 may irradiate light at different cycles according to an embodiment. The first light source 110 may irradiate the first light with a period of T1. For example, when T1 is 1 msec, the first light source 110 may irradiate light in a period of 0 to 1 msec, and may not irradiate light in a period of 2 msec to 3 msec. The second light source 120 may irradiate light at a different cycle than the first light source 110. For example, when T1 is 1 msec, the cycle T2 of the second light source 120 may be 2 msec. In this example, the second light source 120 may not irradiate light in a period of 0 to 1 msec, and may irradiate light in the period of 2 msec to 3 msec.

Based on the cycle of the first light source 110 and the second light source 120, the processor 140 may identify whether the reflected light is reflected by the first light source 110 or by the second light source 120. The processor 140 may identify the reflected light received at the sensor 130 in the T1 cycle as reflected light by the first light source 110, and may identify the reflected light received at the sensor 130 in the T2 cycle as the reflected light by the second light source 120.

The processor 140 may calculate the first distance by applying the first algorithm to the reflected light by the first light source 110 and calculate the second distance by applying the second algorithm to the reflected light by the second light source 120 to determine whether the plurality of reflected lights is lights reflected by the same object or lights reflected by different objects. This has been described in detail above and will not be further described.

Figure 12:
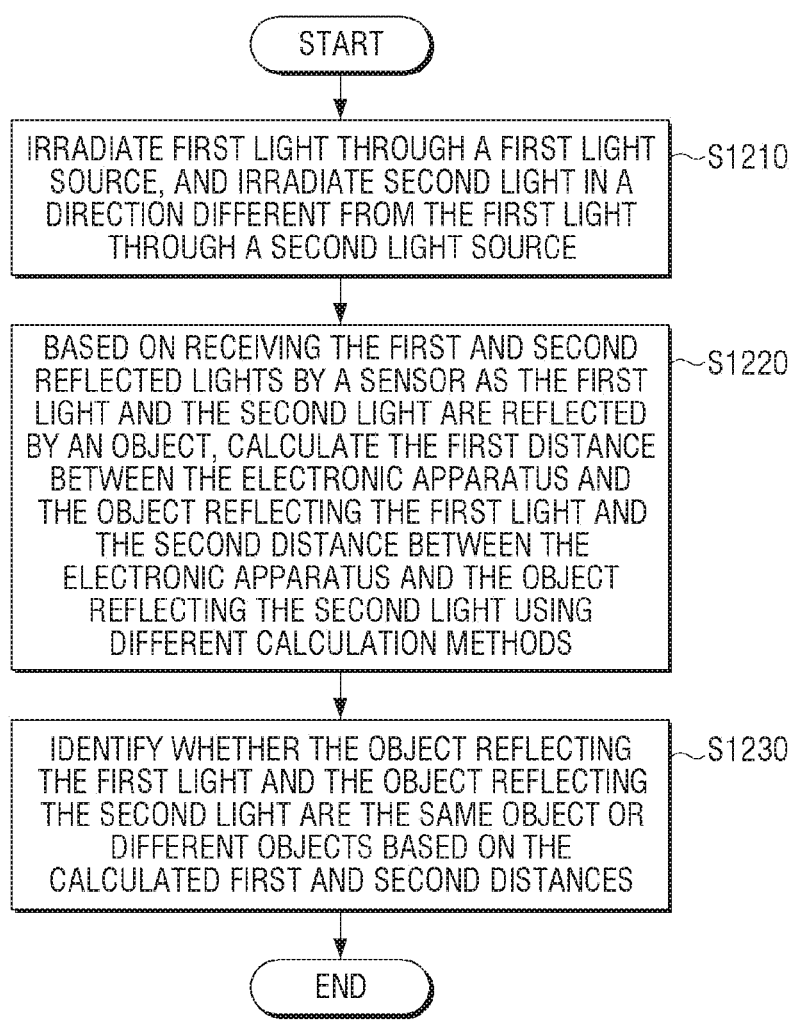
FIG. 12 is a flowchart illustrating a method for controlling an electronic apparatus according to an embodiment of the disclosure.

FIG. 12 is a flowchart illustrating a method for controlling an electronic apparatus according to an embodiment of the disclosure.

Referring to FIG. 12, the electronic apparatus 100 may irradiate the first light through the first light source and may irradiate the second light in a direction different from the first light through the second light source in operation S1210. The first light source may be located at a row upper than or equal to the second light source.

When the first and second reflected lights are received by a sensor as the first light and the second light are reflected by an object, the electronic apparatus may calculate the first distance between the electronic apparatus 100 and the object reflecting the first light and the second distance between the electronic apparatus 100 and the object reflecting the second light using different calculation methods in operation S1220.

The sensor includes a plurality of pixels, and may be divided into pixels of a first region and pixels in a second region based on pixels of a predetermined row. The electronic apparatus 100 may calculate a first distance between the electronic apparatus 100 and the object reflecting the first light and a second distance between the electronic apparatus 100 and the object reflecting the second light when the first and second reflected light are received in the second region of the sensor and the columns of the first pixels receiving the first reflected light and the columns of the second pixels receiving the second reflected light match at least in part.

The electronic apparatus 100 may identify reflected light received at pixels located in a relatively upper row of the plurality of pixels included in the second region as reflected light by the first light, and identify the reflected light received at the pixels located in the relatively lower row as reflected light by the second light.

The electronic apparatus 100 may determine the first angle based on the position of the row of the first pixels receiving the first reflected light, calculate the first distance by applying the first algorithm to the installation angle of the sensor and the distance from the first light source to the sensor, determine the second angle based on the position of the row of the second pixels which received the second reflected light, and calculate the second distance by applying the second algorithm to the second angle, the installation angle of the sensor, the irradiation angle of the second light source, and the distance from the second light source to the sensor. Since a detailed description of the method of calculating the first and second distances is described above, the description thereof will be omitted.

The electronic apparatus 100 may identify whether the object reflecting the first light and the object reflecting the second light are the same object or different objects based on the calculated first and second distances in operation S1230.

If the difference between the calculated first and second distances is less than or equal to a predetermined value, the electronic apparatus 100 may identify that the object reflecting the first light and the object reflecting the second light are the same object, and if the difference between the calculated first and second distances exceeds a predetermined value, the electronic apparatus 100 may identify that the object reflecting the first light and the object reflecting the second light are different objects.

Figure 13:
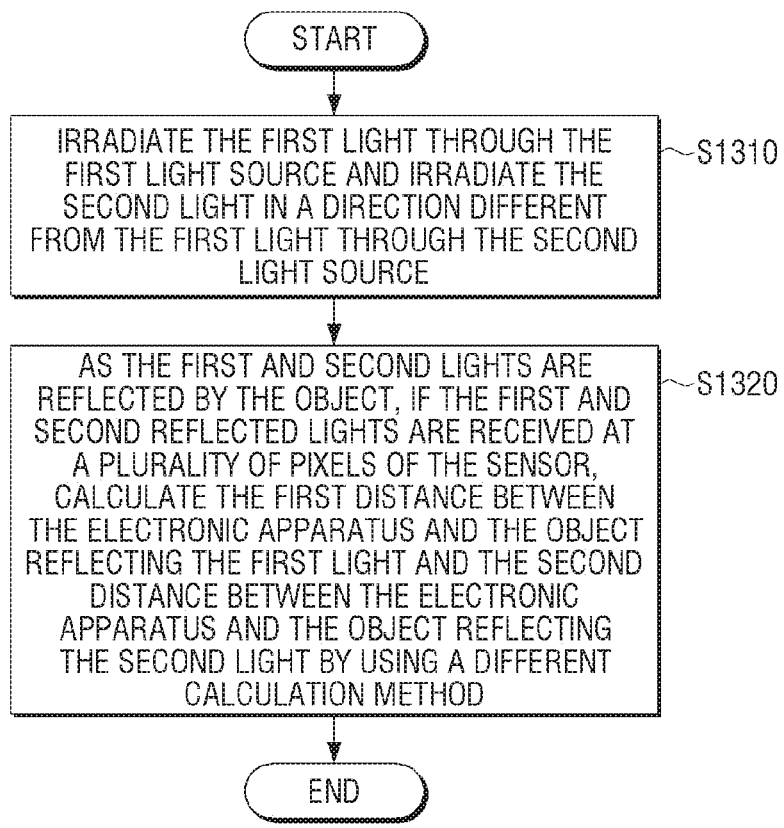
FIG. 13 is a flowchart illustrating a method for controlling a sensor according to an embodiment of the disclosure.

FIG. 13 is a flowchart illustrating a method for controlling a sensor according to an embodiment of the disclosure.

Referring to FIG. 13, the sensor 700 may irradiate the first light through the first light source and may irradiate the second light in a direction different from the first light through the second light source in operation S1310. The first light source may be located at an upper portion of the second light source.

As the first and second lights are reflected by the object, if the first and second reflected lights are received by the image sensor, the sensor 700 may calculate the first distance between the electronic apparatus 100 and the object reflecting the first light and the second distance between the electronic apparatus 100 and the object reflecting the second light by using a different calculation method in operation S1320.

The image sensor may include a plurality of pixels, and the plurality of pixels may be divided into pixels of a first region and pixels in a second region on the basis of pixels of a predetermined row. The sensor 700 may calculate a first distance between the electronic apparatus 100 and the object reflecting the first light and a second distance from the object reflecting the second light when the first and second reflected light are received in the second region of the sensor and the columns of the first pixels receiving the first reflected light and the columns of the second pixels receiving the second reflected light match in at least a part.

The sensor 700 may identify reflected light received at pixels located in a relatively upper row of the plurality of pixels included in the second region as reflected light by the first light, and identify the reflected light received at the pixels located in the relatively lower row as reflected light by the second light.

The sensor 700 may determine the first angle based on the position of the row of the first pixels receiving the first reflected light, calculate the first distance by applying the first algorithm to the first angle, installation angle of the image sensor and the distance from the first light source to the image sensor, determine the second angle based on the position of the row of the second pixels receiving the second reflected light, and calculate the second distance by applying the second algorithm to the second angle, the installation angle of the image sensor, the irradiation angle of the second light source, and the distance from the second light source to the image sensor. Since a detailed description of the method of calculating the first and second distances is described above, the description thereof will be omitted.

Figure 14:
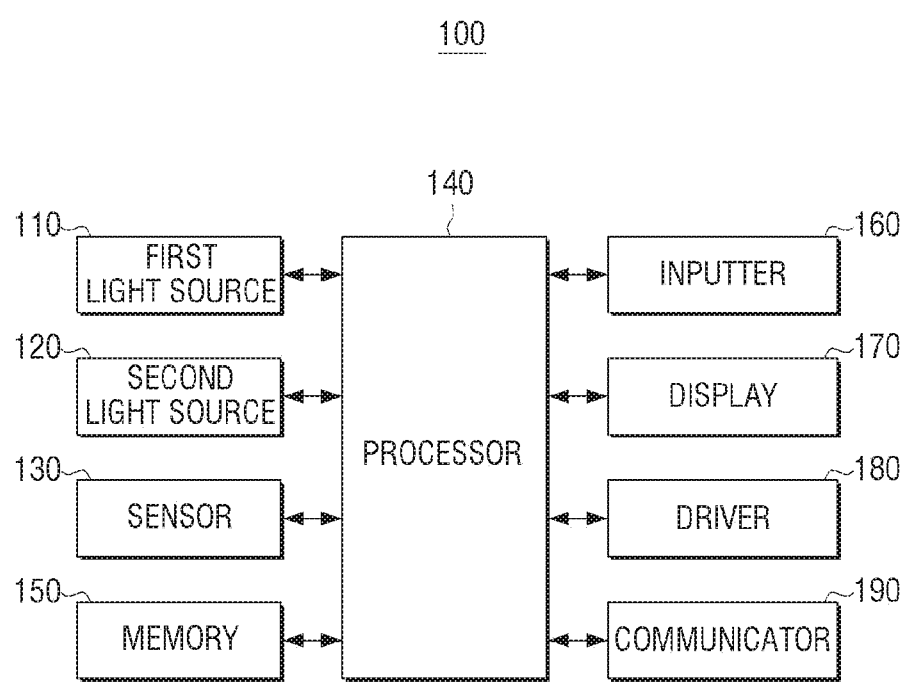
FIG. 14 is a detailed block diagram illustrating an electronic apparatus according to an embodiment of the disclosure.

FIG. 14 is a detailed block diagram illustrating an electronic apparatus according to an embodiment of the disclosure.

Referring to FIG. 14, the electronic apparatus 100 may include a first light source 110, a second light source 120, a sensor 130, a memory 150, an inputter 160, a display 170, a driver 180, a communicator 190, and a processor 140. The parts overlapped with the above description will be omitted or shortened.

The memory 150 may store operating systems (OS) for controlling the overall operation of the components of the electronic apparatus 100 and instructions or data associated with the components of the electronic apparatus 100.

The processor 140 may control multiple hardware or software components of the electronic apparatus 100 using various instructions or data stored in the memory 150, load instructions or data received from at least one of the other components into a volatile memory, and store the various data in a non-volatile memory.

The memory 150 may store information about the first algorithm for calculating the distance between the electronic apparatus 100 and the object based on the reflected light by the first light source 110, and store information about the second algorithm for calculating the distance between the electronic apparatus 100 and the object based on the reflected light by the second light source 120. The memory 150 may store information about the thickness of the reflected light by the first light source 110 divided by the distance, and information on the thickness of the reflected light by the second light source 120.

The inputter 160 may receive a user input. The inputter 160 may include a button and a touch screen.

The display 170 may display a variety of screens. For example, the display 170 may display information about the distance to objects and objects around the electronic apparatus 100.

The display 170 may be implemented as various types of displays such as, for example, and without limitation, a liquid crystal display (LCD), plasma display panel (PDP), or the like. In the display 170, a backlight unit, a driving circuit which may be implemented as a format such as an a-si thin-film transistor (TFT), low temperature poly silicon (LTPS) TFT, organic TFT (OTFT), or the like, may be included as well. The display 170 may be combined with a touch sensor and implemented as a touch screen.

The driver 180 may move the electronic apparatus 100. The driver 180 may include a driving unit such as a motor connected to one or more wheels and capable of rotating the wheels. The driver 180 may perform a driving operation such as moving, stopping, changing a direction, or the like, of the electronic apparatus 100 according to a control signal of the processor 140. For example, if one object is located near the electronic apparatus 100, the driver 180 may be driven so that the electronic apparatus 100 drives by avoiding a corresponding object, and if a plurality of objects are located near the electronic apparatus 100, the driver 180 may be driven so that the electronic apparatus 100 moves by avoiding a plurality of objects.

The communicator 190 is configured to communicate with an external device. For example, the communicator 190 may communicate with various external devices through a wireless communication method such as Bluetooth (BT), Bluetooth low energy (BLE), wireless fidelity (Wi-Fi), Zigbee, or the like, or an infrared (IR) communication method. The communicator 190 may be mounted on the processor 140, and may be included in the electronic apparatus 100 as a configuration separate from the processor 140.

In one embodiment, the electronic apparatus 100 may be implemented with the exception of the configuration of some of the plurality of configurations described above, and may further include a plurality of additional configurations other than those described above.

For example, the electronic apparatus 100 may further include a speaker. The speaker may include a component outputting various audio data on which various processes such as, for example, and without limitation, decoding, amplification, noise filtering, and the like, are performed by an audio processor (not illustrated). A speaker may output sound when a driving of the electronic apparatus 100 is started or when the driving direction is changed.

The electronic apparatus 100 may further include a microphone. The microphone may receive user voice. The user voice may be a user voice or the like for task execution of the electronic apparatus 100.

According to various embodiments as described above, an electronic apparatus capable of identifying whether a plurality of reflected light received in a sensor is light reflected by one object or light reflected by a plurality of objects, and a control method thereof may be provided.

The methods according to various embodiments may be implemented as a format of software or application installable to a related art electronic apparatus.

The methods according to various embodiments may be implemented by software upgrade of a related art electronic apparatus, or hardware upgrade only.

The various embodiments described above may be implemented through an embedded server provided in the electronic apparatus or a server outside the electronic apparatus.

A non-transitory computer readable medium which stores a program for sequentially executing a method for controlling an electronic apparatus according to an embodiment may be provided.

The non-transitory computer readable medium refers to a medium that is readable by an apparatus. To be specific, the aforementioned various applications or programs may be stored in the non-transitory computer readable medium, for example, a compact disc (CD), a digital versatile disc (DVD), a hard disk, a Blu-ray disc, a universal serial bus (USB), a memory card, a read only memory (ROM), and the like, and may be provided.

While the disclosure has been shown and described with reference to various embodiments thereof, it will be understood by those of ordinary skill in the art that various changes in form and details may be made therein without departing from the spirit and scope of the disclosure as defined by the appended claims and their equivalents.

What is claimed is:

1. An electronic apparatus comprising:
    a sensor including a plurality of pixels;
    a first light source;
    a second light source;
    one or more processors; and
    memory storing one or more programs including instructions that, when executed by the one or more processors, cause the electronic apparatus to:
        irradiate a first light from the first light source in a forward horizontal direction,
        irradiate a second light from the second light source in a forward downward direction that is declined by a predetermined angle from the forward horizontal direction,
        based on the second light being irradiated from the second light source and reflected while the first light is irradiated from the first light source and reflected, identify reflected light being received by the sensor as first reflected light based on a position of a row of first pixels receiving the first reflected light among the plurality of pixels, and as second reflected light based on a position of a row of second pixels receiving the second reflected light among the plurality of pixels,
        calculate, based on the reflected light identified as the first reflected light, a first distance that is between the first light source and where the first light is reflected,
        calculate, based on the reflected light identified as the second reflected light, a second distance that is between the second light source and where the second light is reflected, and identify whether the first light and the second light are reflected by a same object or different objects, based on the calculated first distance and the calculated second distance, wherein a location of the first light source is different from a location of the second light source, wherein the first distance is calculated using a first equation, the first equation being y1=r1×tan(a1+b), with y1 being the first distance, r1 being a distance between the first light source and the sensor, a1 being a first angle identified based on the position of the row of the first pixels receiving the first reflected light among the plurality of pixels, and b being an installation angle of the sensor, and wherein the second distance is calculated using a second equation, the second equation being y2=r2×tan(a2+b)× tan(c)/(tan(c)−tan(a2+b)), with y2 being the second distance, r2 being a distance between the second light source and the sensor, a2 being a second angle identified based on the position of the row of the second pixels receiving the second reflected light among the plurality of pixels, b being the installation angle of the sensor, and c being an irradiation angle of the second light source.

2. The electronic apparatus of claim 1, wherein the one or more programs further include instructions that, when executed by the one or more processors, cause the electronic apparatus to:

identify the reflected light received at pixels located at a relatively upper row among the plurality of pixels as the first reflected light, and identify the reflected light received at pixels located at a relatively lower row on a column identical to the first reflected light as the second reflected light.

3. The electronic apparatus of claim 1, wherein the plurality of pixels are divided into pixels of a first region and pixels of a second region, based on pixels of a predetermined row, and wherein the one or more programs further include instructions that, when executed by the one or more processors, cause the electronic apparatus to:

based on the first pixels and the second pixels being among the pixels of the second region, calculate the first distance using the first equation and calculate the second distance using the second equation.

4. The electronic apparatus of claim 3, wherein the second region comprises pixels disposed at a row lower than or equal to pixels in the predetermined row among the plurality of pixels.

5. The electronic apparatus of claim 1, wherein the one or more programs further include instructions that, when executed by the one or more processors, cause the electronic apparatus to:

based on a difference between the calculated first distance and the calculated second distance being less than or equal to a predetermined value, identify that the first light and the second light are reflected by the same object, and based on the difference between the calculated first distance and the calculated second distance being greater than the predetermined value, identify that the first light and the second light are reflected by the different objects.

6. A method performed by an electronic apparatus, the method comprising:

irradiating a first light from a first light source in a forward horizontal direction;

irradiating a second light from a second light source in a forward downward direction that is declined by a predetermined angle from the forward horizontal direction;

based on the second light being irradiated from the second light source and reflected while the first light is irradiated from the first light source and reflected, identifying reflected light being received by a sensor of the electronic apparatus including a plurality of pixels as first reflected light based on a position of a row of first pixels receiving the first reflected light among the plurality of pixels, and as second reflected light based on a position of a row of second pixels receiving the second reflected light among the plurality of pixels;

calculating, based on the reflected light identified as the first reflected light, a first distance that is between the first light source and where the first light is reflected;

calculating, based on the reflected light identified as the second reflected light, a second distance that is between the second light source and where the second light is reflected; and identifying whether the first light and the second light are reflected by a same object or different objects, based on the calculated first distance and the calculated second distance, wherein a location of the first light source is different from a location of the second light source, wherein the first distance is calculated using a first equation, the first equation being y1=r1×tan(a1+b), with y1 being the first distance, r1 being a distance between the first light source and the sensor, a1 being a first angle identified based on the position of the row of the first pixels receiving the first reflected light among the plurality of pixels, and b being an installation angle of the sensor, and wherein the second distance is calculated using a second equation, the second equation being y2=r2×tan(a2+b)× tan(c)/(tan(c)−tan(a2+b)), with y2 being the second distance, r2 being a distance between the second light source and the sensor, a2 being a second angle identified based on the position of the row of the second pixels receiving the second reflected light among the plurality of pixels, b being the installation angle of the sensor, and c being an irradiation angle of the second light source.

7. The method of claim 6, wherein the identifying of the reflected light comprises:

identifying the reflected light received at pixels located at a relatively upper row among the plurality of pixels as the first reflected light; and identifying the reflected light received at pixels located at a relatively lower row on a column identical to the first reflected light as the second reflected light.

8. The method of claim 6, wherein the plurality of pixels are divided into pixels of a first region and pixels of a second region, based on pixels of a predetermined row, and wherein the first distance is calculated using the first equation and the second distance is calculated using the second equation, based on the first pixels and the second pixels being among the pixels of the second region.

9. The method of claim 8, wherein the second region comprises pixels disposed at a row lower than or equal to pixels in the predetermined row among the plurality of pixels.

10. The method of claim 6, wherein the identifying of whether the first light and the second light are reflected by the same object or the different objects comprises:
based on a difference between the calculated first distance and the calculated second distance being less than or equal to a predetermined value, identifying that the first light and the second light are reflected by the same object; and
based on the difference between the calculated first distance and the calculated second distance being greater than the predetermined value, identifying that the first light and the second light are reflected by the different objects.

11. A sensor comprising:
a plurality of pixels;
a first light source;
a second light source;
one or more processors; and
memory storing one or more programs including instructions that, when executed by the one or more processors, cause the sensor to:
irradiate a first light from the first light source in a forward horizontal direction,
irradiate a second light from the second light source in a forward downward direction that is declined by a predetermined angle from the forward horizontal direction,
based on the second light being irradiated from the second light source and reflected while the first light is irradiated from the first light source and reflected, identify reflected light being received by the sensor as first reflected light based on a position of a row of first pixels receiving the first reflected light among the plurality of pixels, and as second reflected light based on a position of a row of second pixels receiving the second reflected light among the plurality of pixels,
calculate, based on the reflected light identified as the first reflected light, a first distance that is between the first light source and where the first light is reflected,
calculate, based on the reflected light identified as the second reflected light, a second distance that is between the second light source and where the second light is reflected, and
identify whether the first light and the second light are reflected by a same object or different objects, based on the calculated first distance and the calculated second distance,
wherein a location of the first light source is different from a location of the second light source,
wherein the first distance is calculated using a first equation, the first equation being $y1 = r1 \times \tan(a1+b)$, with $y1$ being the first distance, $r1$ being a distance between the first light source and the sensor, $a1$ being a first angle identified based on the position of the row of the first pixels receiving the first reflected light among the plurality of pixels, and $b$ being an installation angle of the sensor, and
wherein the second distance is calculated using a second equation, the second equation being $y2 = r2 \times \tan(a2+b) \times \tan(c)/(\tan(c) - \tan(a2+b))$, with $y2$ being the second distance, $r2$ being a distance between the second light source and the sensor, $a2$ being a second angle identified based on the position of the row of the second pixels receiving the second reflected light among the plurality of pixels, $b$ being the installation angle of the sensor, and $c$ being an irradiation angle of the second light source.

12. The sensor of claim 11, wherein the one or more programs further include instructions that, when executed by the one or more processors, cause the sensor to:
identify the reflected light received at pixels located at a relatively upper row among the plurality of pixels as the first reflected light, and
identify the reflected light received at pixels located at a relatively lower row on a column identical to the first reflected light as the second reflected light.

13. The sensor of claim 11,
wherein the plurality of pixels are divided into pixels of a first region and pixels of a second region, based on pixels of a predetermined row, and
wherein the one or more programs further include instructions that, when executed by the one or more processors, cause the sensor to:
based on the first pixels and the second pixels being among the pixels of the second region, calculate the first distance using the first equation and calculate the second distance using the second equation.

14. The sensor of claim 13, wherein the second region comprises pixels disposed at a row lower than or equal to pixels in the predetermined row among the plurality of pixels.

15. The sensor of claim 11, wherein the one or more programs further include instructions that, when executed by the one or more processors, cause the sensor to:
based on a difference between the calculated first distance and the calculated second distance being less than or equal to a predetermined value, identify that the first light and the second light are reflected by the same object, and
based on the difference between the calculated first distance and the calculated second distance being greater than the predetermined value, identify that the first light and the second light are reflected by the different objects.

* * * * *